US006339758B1

(12) United States Patent
Kanazawa et al.

(10) Patent No.: US 6,339,758 B1
(45) Date of Patent: Jan. 15, 2002

(54) NOISE SUPPRESS PROCESSING APPARATUS AND METHOD

(75) Inventors: Hiroshi Kanazawa; Masami Akamine, both of Kobe (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/363,843

(22) Filed: Jul. 30, 1999

(30) Foreign Application Priority Data

Jul. 31, 1998 (JP) .......................................... 10-217519

(51) Int. Cl.[7] ............................ G10L 21/02; H04B 1/10

(52) U.S. Cl. ...................... 704/226; 381/94.3; 381/94.7

(58) Field of Search ................................ 704/226, 227, 704/228; 381/71.1, 71.11, 71.14, 94.1, 94.2, 94.3, 94.7, 94.9

(56) References Cited

U.S. PATENT DOCUMENTS 5,511,128 A * 4/1996 Lindemann .................. 381/92
5,754,665 A * 5/1998 Hosoi ........................ 381/94.1
5,917,921 A * 6/1999 Sasaki et al. .............. 381/94.1
5,982,906 A * 11/1999 Ono .......................... 381/94.2
6,032,115 A * 2/2000 Kanazawa et al. .......... 704/234
6,049,607 A * 4/2000 Marash et al. ............. 381/94.1

FOREIGN PATENT DOCUMENTS

JP 10-207490 8/1998

OTHER PUBLICATIONS

Osamu Hoshuyama et al., "A Robust Generalized Sidelobe Canceller with a Blocking Matrix Using Leaky Adaptive Filters", 1996, vol. J79–A No. 9 pp. 1516–1524.

* cited by examiner

*Primary Examiner*—William Korzuch
*Assistant Examiner*—Martin Lerner
(74) *Attorney, Agent, or Firm*—Oblon, Spivak, McClelland, Maier & Neustadt, P.C.

(57) ABSTRACT

A noise suppress processing apparatus has a speech input section for detecting speech uttered by the speaker at different positions, an analyzer section for obtaining frequency components in units of channels by frequency-analyzing speech signals in units of speech detecting positions, a first beam former processor section for obtaining target speech components by suppressing noise in the speaker direction by filtering the frequency components in units of channels using filter coefficients, which are calculated to decrease the sensitivity levels in directions other than a desired direction, a second beam former processor section for obtaining noise components by suppressing the speech of the speaker by filtering the frequency components for the plural channels obtained by the analyzer section to set low sensitivity levels in directions other than a desired direction, an estimating section for estimating the noise direction from the filter coefficients of the first beam former processor section, and estimating the target speech direction from filter coefficients of the second beam former processor section, and a correcting section for correcting a first input direction as the arrival direction of the target speech to be input in the first beam former processor section on the basis of the target speech direction estimated by the estimating section, and correcting a second input direction as the arrival direction of noise to be input in the second beam former processor section on the basis of the noise direction estimated by the estimating section.

20 Claims, 9 Drawing Sheets

ARRANGEMENT OF MODIFIED 2ch SS

NOISE SUPPRESS PROCESSING APPARATUS AND METHOD

BACKGROUND OF THE INVENTION

The present invention relates to a noise suppress processing apparatus for suppressing noise and extracting target speech, using a plurality of microphones.

Since there are various noise sources in noisy environments, it is difficult to avoid noise which gets mixed from surrounding noise sources upon receiving a speech signal by a microphone. However, when a speech signal mixed with noise is reproduced, the speech becomes hard to discern. Therefore, a processing for reducing noise components is required.

As a conventional noise reduction processing technique for suppressing noise mixed in speech, a technique for suppressing noise using a plurality of microphones is known. Such microphone processing techniques have been studied and developed by many researchers for the purpose of speech input in a speech recognition apparatus, teleconference apparatus, and the like. Of these techniques, as for a microphone array using an adaptive beam former processing technique which can obtain great effects by a smaller number of microphones, various methods such as a generalized sidelobe canceller (GSC), frost type beam former, reference signal method, and the like are available, a described in reference 1 (The Institute of Electronics, Information and Communication Engineers (ed.), "Acoustic System and Digital Processing") or reference 2 (Heykin, "Adaptive Filter Theory" (Prentice Hall)).

Note that the adaptive beam former processing suppresses noise by a filter which makes a dead angle with the arrival direction of noise.

However, in this adaptive beam former processing technique, if the arrival direction of an actual target signal does not coincide with the assumed arrival direction, that target signal is determined as noise and removed, thus deteriorating performance.

To solve this problem, a technique which allows certain offset between the assumed and actual arrival directions has been developed, as disclosed in reference 3 (Hojuzan et al., "Robust Global Sidelobe Canceller using Leak Adaptive Filter in Blocking Matrix", Journal of The Institute of Electronics, Information and Communication Engineers A, Vol. J79-A, No. 9, pp. 1516 to 1524 (1996. 9)). However, in this case, removal of a target signal can be suppressed, but the target signal may be distorted due to the offset between the assumed and actual arrival directions.

By contrast, a method of tracking the direction of a speaker and reducing distortion of a target signal by detecting the speaker direction as needed and correcting the input direction of a beam former in the detected direction using a plurality of beam formers has been disclosed in, e.g., Jpn. Pat. Appln. KOKAI Publication No. 9-9794.

However, since the method disclosed in Jpn. Pat. Appln. KOKAI Publication No. 9-9794 executes adaptive filter processing in the time domain, the filter coefficients in the time domain must be converted into those in the frequency domain upon estimating the speaker direction on the basis of the filter coefficients, resulting in a large computation amount.

As a technique for suppressing noise mixed in speech, an adaptive beam former processing technique which receives speech or an utterance of a speaker using a plurality of microphones, and suppresses noise component by filtering the received speech using a filter which makes a dead angle with the arrival direction of noise is known.

In the adaptive beam former processing technique, when the arrival direction of an actual target signal, i.e., the direction where a speaker is present, is different from the assumed arrival direction, the target signal is determined as noise and is removed.

To solve this problem, a technique which allows certain offset between the assumed and actual arrival directions has been developed. However, in this case, removal of a target signal can be suppressed, but the target signal may be distorted due to the offset between the assume and actual arrival directions. Hence, a problem which pertains to the quality of the obtained speech remains unsolved.

Also, a method of tracking the direction of a speaker and reducing distortion of a target signal by sequentially detecting the speaker direction and correcting the input direction of a beam former to make it coincide with the detected direction using a plurality of beam formers has been proposed. However, since this method executes adaptive filter processing in the time domain, the filter coefficients in the time domain must be converted into those in the frequency domain upon estimating the speaker direction on the basis of the filter coefficients, resulting in a large computation amount.

Therefore, the conventional techniques have both merits and demerits, and development of a beam former processing technique which can collect a high-quality target signal, and can shorten the processing time has been demanded.

BRIEF SUMMARY OF THE INVENTION

It is an object of the present invention to provide a noise suppress processing apparatus and method, which can greatly reduce the computation amount using a beam former which operates in the frequency domain.

According to the first aspect of the present invention, there is provided a noise suppression apparatus for independently outputting speech frequency components and noise frequency components, comprising a speech input section which receives speech uttered by a speaker at different positions and generates speech signals corresponding to the different positions, a frequency analyzer section which frequency-analyzes the speech signals in units of channels of the speech signals to output frequency components for a plurality of channels, a first beam former processor section which suppresses arrival noise other than a target speech by adaptive filtering using the frequency components for the plurality of channels to output the target speech, a second beam former processor section which suppresses the target speech by adaptive filtering using the frequency components for the plurality of channels to outputting noise, a noise direction estimating section which estimates a noise direction from filter coefficients calculated by the first beam former processor section, a target speech direction estimating section which estimates a target speech direction from filter coefficients calculated by the second beam former processor section, a target speech direction correcting section which corrects a first input direction as an arrival direction of the target speech to be input in the first beam former processor section on the basis of the target speech direction estimated by the target speech direction estimating section, as needed, and a noise direction correcting section which corrects a second input direction as an arrival direction of noise to be input in the second beam former processor section on the basis of the noise direction estimated by the noise direction estimating section, as needed.

According to the second aspect of the present invention, there is provided a noise suppression apparatus for independently outputting speech frequency components and noise frequency components, comprising a speech input section which receives speech uttered by a speaker at least at two different position and generates speech signals corresponding to the speech receiving positions in units of channels, a frequency analyzer section which frequency-analyzes the speech signals and outputs frequency components for a plurality of channels, a first beam former processor section which executes arrival noise suppression processing for suppressing speech components other than speech from a speaker direction to obtain a target speech component, the noise suppression processing being performed by adaptive filtering of the frequency components for the plurality of channels obtained by the frequency analyzer section, using filter coefficients which are calculated to decrease sensitivity levels in directions other than a desired direction, a second beam former processor section which executes second speech suppression processing for suppressing the speech from the speaker direction to obtain a first noise component, the speech suppression processing being performed by adaptive filtering of the frequency components for the plurality of channels obtained by the frequency analyzer section, using filter coefficients which are calculated to decrease sensitivity levels in directions other than a desired direction, a third beam former processor section which executes second speech suppression processing for suppressing the speech from the speaker direction to obtain a second noise component, the second speech suppression processing being performed by adaptive filtering of the frequency components for the plurality of channels obtained by the frequency analyzer section, using filter coefficients which are calculated to decrease sensitivity levels in directions other than a desired direction, a noise direction estimating section which estimates a noise direction from the filter coefficients calculated by the first beam former processor section, a first target speech direction estimating section which estimates a first target speech direction from the filter coefficients calculated by the second beam former processor section, a second target speech direction estimating section which estimates a second target speech direction from the filter coefficients calculated by the third beam former processor section, a first input direction correcting section which corrects a first input direction as an arrival direction of target speech to be input in the first beam former processor section on the basis of at least one of the first target speech direction estimated by the first target speech direction estimating section and the second target speech direction estimated by the second target speech direction estimating section, as needed, a second input direction correcting section which, when the noise direction estimated by the noise direction estimating section falls with a predetermined first range, corrects a second input direction as an arrival direction of noise to be input in the second beam former processor section on the basis of the noise direction, as needed, a third input direction correcting section which, when the noise direction estimated by the noise direction estimating section falls with a predetermined second range, corrects a second input direction as an arrival direction of noise to be input in the third beam former processor section on the basis of the noise direction, as needed, and an effective noise determination section which determines one of the first and second output noise components as true noise output components on the basis of whether the noise direction estimated by the noise direction estimating section falls within the predetermined first or second range and outputs the determined output noise component, and at the same time, determines which estimation result of the first and second speech direction estimating sections is effective and outputs the determined speech direction estimation result to the first input direction correcting section.

According to the third aspect of the present invention, there is provided a noise suppression method for independently outputting speech frequency components and noise frequency components, as needed, comprising the steps of receiving speech uttered by a speaker at different positions to obtain speech signals of different channels, frequency-analyzing the speech signals in units of channels to obtain frequency spectrum components in units of channels, suppressing arrival noise other than a target speech by adaptive filtering using the frequency spectrum components in units of channels obtained in the frequency analyzing step, to output the target speech, suppressing the target speech by adaptive filtering using the frequency components in units of channels to obtain noise components, estimating a noise direction from filter coefficients used in adaptive filtering and calculated in the step of suppressing arrival noise, estimating a target speech direction from filter coefficients used in adaptive filtering and calculated in the step of suppressing the target speech, correcting a first input direction as an arrival direction of the target speech to be input in the step of suppressing arrival noise on the basis of the target speech direction estimated in the step of estimating a target speech direction, as needed, and correcting a second input direction as an arrival direction of noise to be input in the step of suppressing the target speech on the basis of the noise direction estimated by the step of estimating a noise direction, as needed.

According to the fourth aspect of the present invention, there is provided a noise suppression method comprising the steps of receiving speech uttered by a speaker at different positions to obtain speech signals of different channels, frequency-analyzing speech signals in units of channels to obtain frequency spectrum components in units of channels, executing arrival noise suppression processing for suppressing speech components other than speech from a speaker direction to obtain target speech components, the arrival noise suppression processing being performed by adaptive filtering of the frequency spectrum components for the plurality of channels obtained in units of channels in the frequency analyzing step, using filter coefficients which are calculated to decrease sensitivity levels in directions other than a desired direction, executing first speech suppression processing for suppressing the speech from the speaker direction to obtain first noise components, the first speech suppression processing being performed by adaptive filtering of the frequency components for the plurality of channels using the frequency components obtained in units of channels in the frequency analyzing step, using filter coefficients which are calculated to decrease sensitivity levels in directions other than a desired direction, executing second speech suppression processing for suppressing the speech from the speaker direction to obtain first noise components, the second speech suppression processing being performed by adaptive filtering of the frequency spectrum components for the plurality of channels obtained in units of channels in the frequency analyzing step, using filter coefficients which are calculated to decrease sensitivity levels in directions other than a desired direction, estimating a noise direction from the filter coefficients calculated in the step of suppressing arrival noise suppression processing, estimating a first target speech direction from the filter coefficients calculated in the step of executing first speech suppression processing, estimating a second target speech direction from the filter coefficients calculated in the step of executing second speech suppression processing, correcting a first input direction as an arrival direction of target speech to be input in the step of executing arrival noise suppression processing on the basis of at least one of the first target speech direction and the second target speech direction, as needed, correcting a second input direction as an arrival direction of noise to be input in the step of executing first suppression processing on the basis of the noise direction estimated in the noise direction estimating step, as needed, when the noise direction falls with a predetermined first range, correcting a second input direction as an arrival direction of noise to be input in the step of executing second speech suppression processing on the basis of the noise direction, as needed, when the noise direction falls with a predetermined second range, and determining one of the first and second output noise components as true noise output components on the basis of whether the noise direction estimated in the noise direction estimating step falls within the predetermined first or second range and outputting the determined output noise component, and at the same time, determining that estimation result in the first and second speech direction estimating steps is effective and outputting the determined speech direction estimation result as a speech direction estimation result to be used in the first input direction correcting step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described hereinafter with reference to the accompanying drawings.

Since a noise suppression apparatus according to an embodiment shown in FIG. 1 uses a technique which allows to track a speaker even when the number of microphones is 2ch (ch: channel), i.e., when two microphones as a minimum number of microphones are used, a processing method for 2ch will be explained below. Even when 3ch or more of microphones are used, the same processing method can be used.

Figure 1:
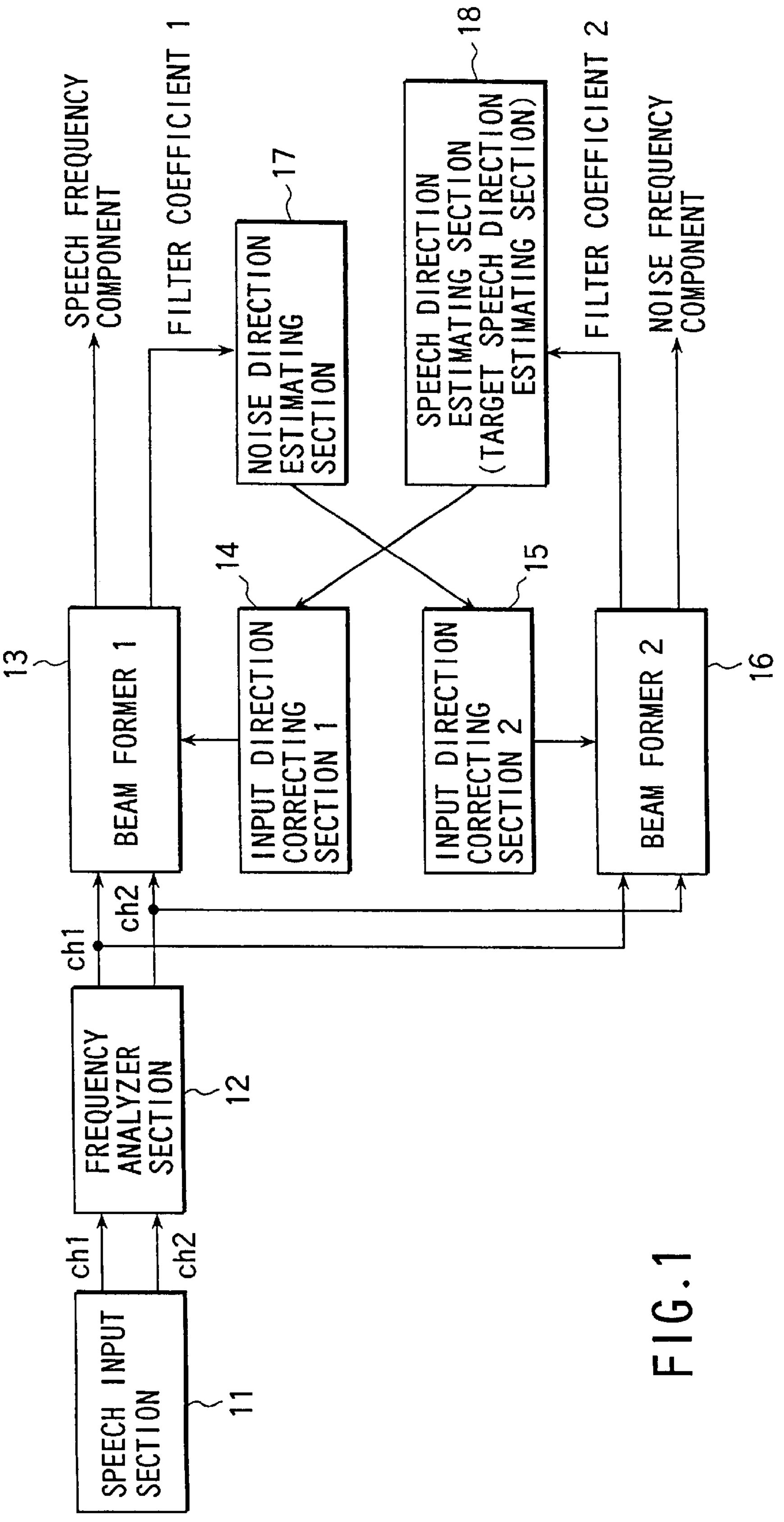
FIG. 1 is a block diagram showing the overall arrangement of the first embodiment of the present invention.

In the embodiment shown in FIG. 1, the apparatus comprises a speech input section 11, frequency analyzer section 12, first beam former 13, first input direction correcting section 14, second input direction correcting section 15, second beam former 16, noise direction estimating section 17, and target speech direction estimating section 18.

Of these sections, the speech input section 11 receives speech (target speech) uttered by a speaker whose speech is to be collected at two or more different positions. More specifically, the speech input section 11 receives speech using two microphones placed at different positions, and converts received speech signals into electrical signals. The frequency analyzer section 12 frequency-analyzes speech signals corresponding to the speech receiving positions of the microphones in units of channels, and outputs a plurality of channels of frequency components. More specifically, the frequency analyzer section 12 converts a speech signal (first-channel (1ch) speech signal) received by a first microphone, and a speech signal (second-channel (2ch) speech signal) received by a second microphone from signal components in the time domain into component data in the frequency domain by, e.g., the fast Fourier transform, i.e., converts the received signals into frequency spectrum data in units of channels and outputs them.

The first beam former 13 outputs a plurality of channels of frequency components from the frequency analyzer section 12. In this case, the first beam former 13 extracts frequency components of target speech from the speech signals of channels 1ch and 2ch. More specifically, the first beam former 13 is a processor section for extracting frequency components coming from a target speech source direction by suppressing incoming noise other than the target speech by adaptive filtering using the frequency components (frequency spectrum data) of channels 1ch and 2ch. The second beam former 16 outputs a plurality of channels of frequency components from the frequency analyzer section 12. In this case, the second beam former 16 extracts frequency components from a noise source direction using the speech signals of channels 1ch and 2ch. More specifically, the second beam former 16 is a processor section for extracting frequency component data coming from a noise source direction by suppressing components other than speech from the noise source direction by adaptive filtering using the frequency components (frequency spectrum data) of channels 1ch and 2ch.

The noise direction estimating section 17 executes a process for estimating the noise direction from filter coefficients calculated by the first beam former 13. More specifically, the noise direction estimating section 17 estimates the noise direction using parameters such as filter coefficients for filtering and the like obtained from an adaptive filter of the first beam former 13, and outputs data corresponding to the estimated amount.

The target speech direction estimating section (speech direction estimating section) 18 executes a process for estimating the target speech direction from filter coefficients calculated by the second beam former 16. More specifically, the target speech direction estimating section 18 estimates the target speech direction from parameters such as filter coefficients used in an adaptive filter of the second beam former 16 and the like, and outputs data corresponding to the estimated amount.

The first input direction correcting section 14 has a function of correcting the input direction of the beam former to make it coincide with an actual target speech direction. More specifically, the first input direction correcting section 14 generates an output for correcting the first input direction as the arrival direction of target speech to be input as needed on the basis of the target speech direction estimated by the target speech direction estimating section 18, and supplies it to the first beam former 13. More specifically, the first input direction correcting section 14 converts data corresponding to the estimated amount output from the target speech direction estimating section 18 into angle information α of the current target speech source direction, and outputs it as target angle information α to the first beam former 13.

The second input direction correcting section 15 has a function of correcting the input direction of the second beam former 16 to make it coincide with the noise direction. That is, the second input direction correcting section 15 generates an output for correcting the second input direction as the arrival direction of noise to be input in the second beam former 16 as needed on the basis of the noise direction estimated by the noise direction estimating section 17, and supplies it to the second beam former 16. More specifically, the second input direction correcting section 15 converts data corresponding to the estimated amount output from the noise direction estimating section 17 into angle information of the current target noise source direction, and outputs it as target angle information α to the second beam former 16.

An example of the arrangement of the beam formers 13 and 16 will be explained below.

Figure 2A:
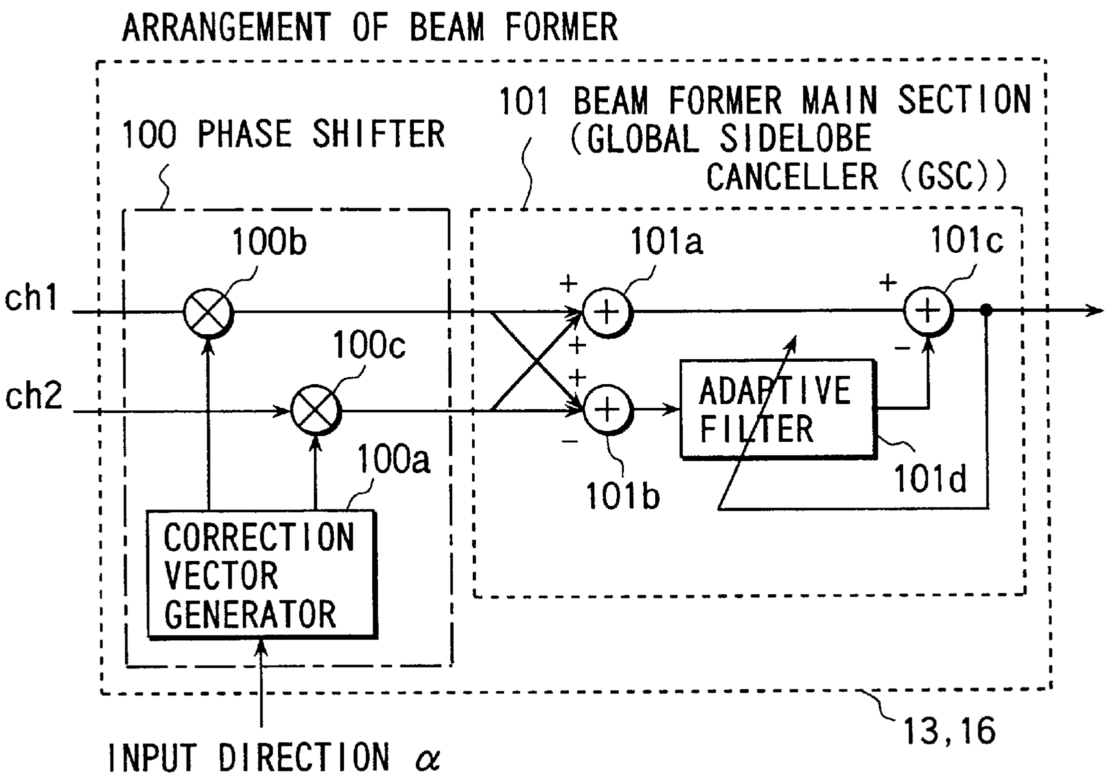
FIGS. 2A and 2B are respectively a block diagram and chart for explaining an example of the arrangement and operation of a beam former used in the present invention.

The beam formers 13 and 16 used in the system of the present invention have an arrangement, as shown in FIG. 2A. More specifically, each of the beam formers 13 and 16 used in the system of the present invention is constructed by a phase shifter 100 for setting the input direction of the beam former to coincide with the arrival direction of signal components to be extracted, so as to obtain signal components to be extracted from input speech, and a beam former main section 101 for suppressing components from directions other than the arrival direction of the signal components to be extracted.

The phase shifter 100 comprises an adjust vector generator 100*a*, and multipliers 100*b* and 100*c*, and the beam former main section 101 comprises adders 101*a*, 101*b*, and 101*c*, and an adaptive filter 101*d*.

The adjust vector generator 100*a* receives the angle information a from the input direction correcting section 14 or 15 as information of the input direction, and generates an adjust vector corresponding to α. The multiplier 100*b* multiplies frequency spectrum component data of channel ch1 output from the frequency analyzer section 12 by the adjust vector component, and outputs the product. The multiplier 100*c* multiplies frequency spectrum component data of channel ch2 output from the frequency analyzer section 12 by the adjust vector component, and outputs the product.

The adder 101*a* adds the outputs from the multipliers 100*b* and 100*c*, and outputs the sum. The adder 101*b* outputs the difference between the outputs from the multipliers 100*b* and 100*c*. The adder 101*c* calculates a difference between the output of the adaptive filter 101*d* and the output of the adder 101*a* and outputs the difference as the output of the beam former. The adaptive filter 101*d* is a digital filter for filtering the output from the adder 101*b*, and its filter coefficients (parameters) are changed as needed to minimize the output from the adder 101*c*.

Figure 2B:
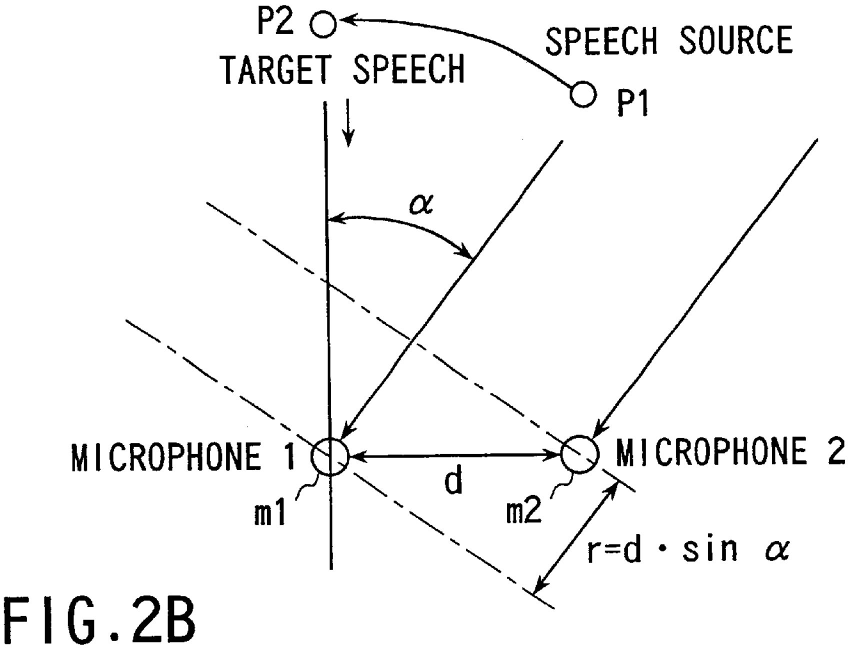

This example shows a system having two speech collecting channels (ch1, ch2), which uses two microphones, i.e., first and second microphones m1 and m2. In this case, the input direction of the beam former is set as follows. That is, as shown in FIG. 2B, the frequency components of two speech channels ch1 and ch2 undergo a phase delay process to be in phase with each other, so that the speech signals from the direction where the object to be input is present appear to have arrived at the two microphones m1 and m2 simultaneously. In case of the arrangement shown in FIG. 2A, such process is implemented by phase adjustment in the phase shifter 100 in correspondence with angle information a output from the input direction correcting section 14 or 15.

More specifically, in case of the arrangement shown in FIG. 2A, in the phase shifter 100, the adjust vector generator 100*a* generates an adjust vector corresponding to the input direction (angle information α) to be corrected, and the multipliers 100*b* and 100*c* multiply the signals of channels 1ch and 2ch by the adjust vector. With this process, phase adjustment is done as follows.

For example, a case will be examined below wherein non-directional microphones denoted by m1 and m2 in FIG. 2B are set, and the phases of signals are corrected as if a speaker as a target speech source located at a point P1 were present at a point P2. In such case, a speaker speech signal (ch1) detected by the first microphone is multiplied by the complex conjugate of a complex number W1:

$$W1=(\cos j\omega\tau, \sin j\omega\tau)$$

corresponding to a propagation time difference τ:

$$\tau=r\cdot c=r\cdot\sin\alpha$$

$$r=d\cdot\sin\alpha$$

where c is the sonic speed, d is the microphone-to-microphone distance, α is the moving angle of the speaker as the speech source of the target speech when viewed from the microphone m1, j is an imaginary number, and ω is the angular frequency.

That is, since the speaker speech signal detected by the first microphone m1 is multiplied by the complex conjugate of W1, speech of the target speech source which has moved the angle α is phase-controlled so that the signal (ch1) detected by the first microphone m1 is in phase with the signal detected by the second microphone m2.

Note that the signal (ch2) detected by the second microphone m2 is multiplied by the complex conjugate of a complex number W2=(1, 0). This means that the angle of the signal (ch2) detected by the second microphone m2 is not corrected.

A vector {W1, W2} as a set of complex numbers W1 and W2 is generally called a direction vector, and a vector conjugate {W1*, W2*} of the complex conjugate in this {W1, W2} is called an adjust vector.

When an adjust vector corresponding to the angle information α is generated, and the frequency spectrum components of channels ch1 and ch2 are multiplied by this adjust vector, the output from the first microphone m1 is corrected to be in phase with that from the second microphone m2 although the speech source has moved from P1 to P2, and the distances from the first and second microphones m1 and m2 to the speech source at the position P2 apparently become equal to each other as far as the first microphone m1 is concerned.

In this embodiment, two beam formers are used. Of these two beam formers, the first beam former 13 delays the frequency components of channel ch1 (or ch2) by the aforementioned scheme using its phase shifter 100, so that the speech source direction of the target speech is set as the input direction. The second beam former 16 delays the frequency components of channel ch1 (or ch2) by the aforementioned scheme using its phase shifter 100, so that the noise source direction is set as the input direction, thus adjusting the phases of the two channels. However, since the phases of neither of the first and second microphones m1 and m2 are corrected in relation to speech components from directions other than the arrival direction of target speech S, i.e., noise components N, the detection timings of noise components N by the first and second microphones m1 and m2 have a time difference.

The output from the first microphone m1, which is phase-corrected by the phase shifter 100 in relation to the detected speech signal from the speech source in the target speech direction (frequency spectrum data of channel ch1 containing target speech components S and noise components N), and the non-corrected output from the second microphone m2 (frequency spectrum data of channel ch2 containing target speech components S and noise components N') are respectively input to the adders 101*a* and 101*b*. The adder 101*a* adds the outputs of channels ch1 and ch2 to obtain power components of the doubled signals of the target speech S and noise components N+N', and the adder 101*b* obtains the difference ((S+N)−(S+N')=N−N') between the output (S+N) of channel ch1, and the output (S+N') of channel ch2, i.e., noise power components. The adder 101*c* calculates the difference between the output of the adaptive filter 101*d* and the output of the adder 101*a*, outputs it as the beam former output, and feeds it back to the adaptive filter 101*d*.

The adaptive filter 101*d* is a digital filter for filtering the output from the adder 101*b* to extract the frequency spectrum of speech which has arrived from a direction corresponding to the current search direction. The adaptive filter 101*d* varies the search angle of the arrival signal in 1° increments, and generates a maximum output when the search angle coincides with the input signal direction. Hence, when the incoming direction of the arrival signal coincides with the search angle, the output (N−N') from the adaptive filter 101*d* is maximized. Since the output (N−N') from the adaptive filter 101*d* contains noise power components, when the maximum output is. supplied to the adder 101*c* and is subtracted from the output (2S+N+N') of the adder 101*a*, noise components N are fully canceled, and noise suppression can be achieved. Hence, in this state, the output from the adder 101*c* is minimum.

For this reason, when the adaptive filter 101*d* changes the signal arrival direction search angle in 1° increments (i.e., sensitivity level in units of directions in 1° increments) and the filter coefficients (parameters) to minimize the output from the adder 101*c*, the incoming direction of the arrival signal and the search angle (the incoming direction of the arrival signal and sensitivity in that direction) coincide with each other. Hence, the adaptive filter 101*d* controls the search angle and filter coefficients which minimize the output from the adder 101*c*.

As a result of this control, the beam former can extract speech components from the target direction. When noise components are extracted as target speech, the aforementioned control can be done while considering noise as target speech.

Note that the beam former main section 101 can use various other beam formers such as a frost type beam former, and the like in addition to a generalized sidelobe canceller (GSC) and, hence, the present invention is not particularly limited to a specific beam former.

The operation of this system with the above arrangement will be explained below. This system separately extracts speech frequency components of target speech, and noise frequency components.

The speech input section 11 having a plurality of microphones (in this embodiment, the speech input section 11 having two, i.e., first and second microphones m1 and m2) receives speech signals of channels ch1 and ch2. The speech signals for two channels (ch1, ch2) input from the speech input section 11 (i.e., the first channel ch1 corresponds to the speech signal from the first microphone m1, and the second channel ch2 corresponds to the speech signal from the second microphone m2) are sent to the frequency analyzer section 12, which obtains frequency components (frequency spectrum data) in units of channels by, e.g., the fast Fourier transform (FFT) or the like.

The frequency components in units of channels obtained by the frequency analyzer section 12 are respectively supplied to the first and second beam formers 13 and 16.

In the first beam former 13, the frequency components for two channels are adjusted to a phase corresponding to the direction of the target speech, and are then processed by the adaptive filter in the frequency domain by the aforementioned scheme, thus suppressing noise, and outputting the frequency components in the direction of the target speech.

More specifically, the first input direction hcorrecting section 14 supplies the following angle information (α) to the first beam former 13. That is, the first input direction correcting section 14 supplies to the first beam former 13, as an input direction correcting amount, angle information (α) required for adjusting the input phases of the frequency components for two channels to make the direction of the target speech apparently coincide with the front direction of each microphone, using the output supplied from the speech direction estimating section 18.

As a result, the first beam former 13 corrects the target speech direction in correspondence with this correcting amount, and suppresses speech components coming from directions other than the target speech direction, thereby suppressing noise components and extracting the target speech.

The target speech direction estimating section 18 detects the noise source direction using parameters of the adaptive filter in the second beam former 16 which extracts noise components, and generates an output which reflects the detected direction. The first input direction correcting section 14 generates the input direction correcting amount (α) in correspondence with the output from this target speech direction estimating section 18, and corrects the target speech direction in the first beam former 13 in correspondence with this correcting amount (α). Since the first beam former 13 suppresses speech components coming from directions other than the target speech direction, noise components are suppressed, and the target speech can be extracted.

That is, the second beam former 16 adjusts phase to noise since its target speech is noise. As a result, in the second beam former 16, the speaker speech source is processed as a noise source, and the internal adaptive filter of the beam former extracts speech from the speaker speech source. Hence, the output which reflects the direction of the speaker speech source can be obtained from the parameters of the adaptive filter of the second beam former 16. Hence, when the target speech direction estimating section 18 detects the noise source direction using the parameters of the adaptive filter in the second beam former 16, this noise source direction corresponds to a direction which reflects the direction of the speaker speech source as the target speech. Hence, when the target speech direction estimating section 18 generates an output which reflects the parameters of the adaptive filter in the second beam former 16, the first input direction correcting section 14 generates an input direction correcting amount ($\alpha$) corresponding to the output from this target speech direction estimating section 18, and the target speech direction in the first beam former 13 is corrected in correspondence with this correcting amount, the first beam former 13 can suppress speech components coming from directions other than the target speech direction.

The second beam former 16 suppresses the target speech using the adaptive filter in the frequency domain with respect to frequency component inputs for two channels, and outputs frequency components in the noise direction. More specifically, the noise direction is assumed to be the front direction of each microphone, and the second input direction correction section 15 adjusts phase using the output from the noise direction estimating section 17, so that noise components can be considered to have arrived at the two microphones simultaneously.

The noise direction estimating section 17 detects the noise source direction using the parameters of the adaptive filter in the first beam former 13 which extracts speaker speech components, and generates an output which reflects the detected direction. The second input direction correcting section 15 generates an input direction correcting amount ($\alpha$) corresponding to the output from the noise direction estimating section 17, and supplies it to the second beam former 16. The second beam former 16 corrects the noise direction in correspondence with the correcting amount, and suppresses speech components coming from directions other than that noise source direction, thereby extracting noise components alone.

The noise direction estimating section 17 estimates the noise direction on the basis of the parameters of the adaptive filter of the first beam former 13, and the target speech direction estimating section 18 estimates the target speech direction on the basis of the parameters of the adaptive filter of the second beam former 16.

Note that these processes are done at short fixed time intervals (e.g., 8 msec). The fixed time period will be referred to as a frame hereinafter.

In this manner, the first beam former 13 can extract speech components of the target speech (speaker), and the second beam former 16 can extract noise components.

If the environment where the apparatus of this embodiment is placed is a quiet conference room, and a teleconference system is set in this conference room to use the apparatus to extract the speech of a speaker of the teleconference system, noise to be removed is not noise which seriously hampers input of target speech. In such case, the target speech (speaker) components extracted by the first beam former 13 are reconverted into a speech signal in the time domain by the inverse Fourier transform, and that speech signal is output as speech via a loudspeaker or is transmitted. In this manner, the extracted speech signal can be used as noise-reduced speech of the speaker.

The processing sequence of the direction estimating sections 17 and 18 will be explained below.

Figure 3:
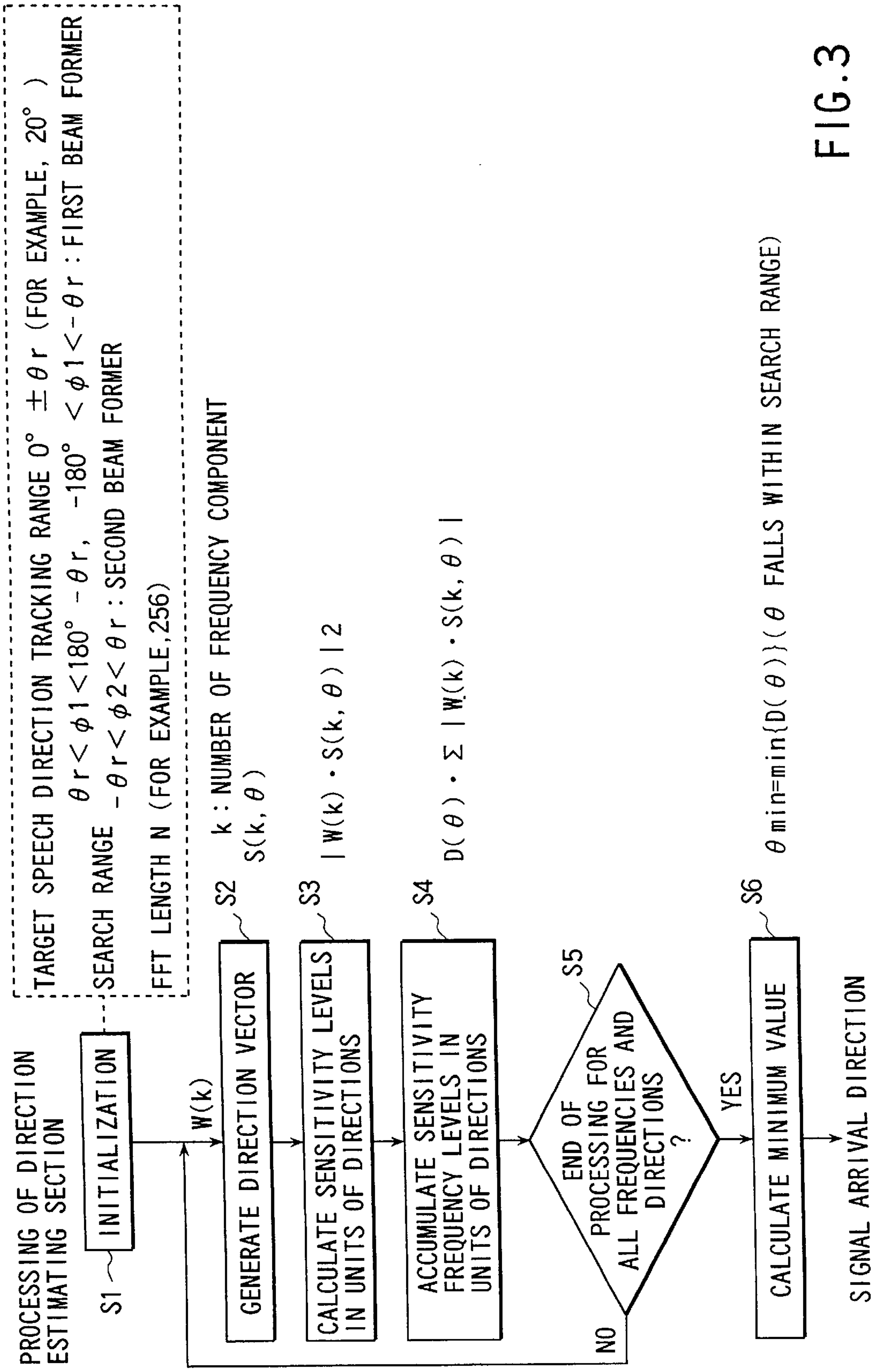
FIG. 3 is a flow chart for explaining the operation of a direction estimating section in the first embodiment of the present invention.

FIG. 3 shows the processing sequence of the direction estimating sections 17 and 18.

This processing is done in units of frames. First, initialization is executed (step S1). As the initialization contents, as shown in a portion bounded by the dotted frame in FIG. 3, "the tracking range of the target speech" is set at "$0°\pm r\theta$" (e.g., 20°), and the remaining range is set as the search range of noise.

Upon completion of initialization, the flow advances to step S2. In step S2, a process for generating a direction vector is executed. After a sensitivity calculation is made in a given direction, the sensitivity levels of the respective frequency components in that direction are accumulated (steps S3 and S4).

After this process has been done for all the frequencies and directions, a minimum accumulated value is obtained, and the direction of a frequency having a minimum accumulated value is determined to be the signal arrival direction (steps S5 and S6).

More specifically, in steps S2 to S4, processes for calculating the dot product of a filter coefficient W(k) and direction vector S(k, $\theta$) in a direction of a predetermined range in 1° increments in units of frequency components so as to obtain a sensitivity level in the corresponding direction, and summing up the obtained sensitivity levels of all frequency components, are executed. In steps S5 and S6, processes for determining a direction corresponding to the minimum one of the accumulated values in units of directions, which are obtained as a result of summing up the sensitivity levels of all the frequency components, to be the signal arrival direction, are executed.

The processing sequence shown in FIG. 3 applies to both the noise direction estimating section 17 and target speech direction estimating section 18.

In this manner, the noise direction estimating section 17 estimates the noise direction, and the target speech direction estimating section 18 estimates the target speech direction. These estimation results are supplied to the corresponding input direction correcting sections 14 and 15.

Upon receiving the estimation result of the noise direction, the first input direction correcting section 14 averages the input direction of the previous frame, and the direction estimation result of the current frame to calculate a new input direction, and outputs it to the phase shifter 100 of the corresponding beam former. On the other hand, upon receiving the estimation result of the target speech direction, the second input direction correcting section 15 also averages the input direction of the previous frame, and the direction estimation result of the current frame to calculate a new input direction, and outputs it to the phase shifter 100 of the corresponding beam former.

Averaging is done using a coefficient $\beta$by:

$$\theta 1(n)=\theta 1(n-1)\cdot(1-\alpha)+E(n)\cdot\beta$$

where $\theta 1$ is the input direction of speech, n is the number of the processing frame, and E is the direction estimation result of the current frame. Note that the coefficient $\beta$ may be varied on the basis of the output power of the beam former.

If the beam former is a GSC, it requires conversion from filter coefficients in the time domain into those in the frequency domain upon estimating the direction in the conventional system. However, in the present invention, the adaptive filter of the GSC filters frequency spectrum data using directional sensitivity to extract components in directions other than the target direction. Since filter coefficients used in filtering are originally obtained in the frequency domain, the need for the conversion from filter coefficients in the time domain into those in the frequency domain can be obviated unlike the conventional system. Hence, the system of the present invention can improve the processing speed even when the GSC is used, since no conversion from filter coefficients in the time domain into those in the frequency domain is required.

Figure 4:
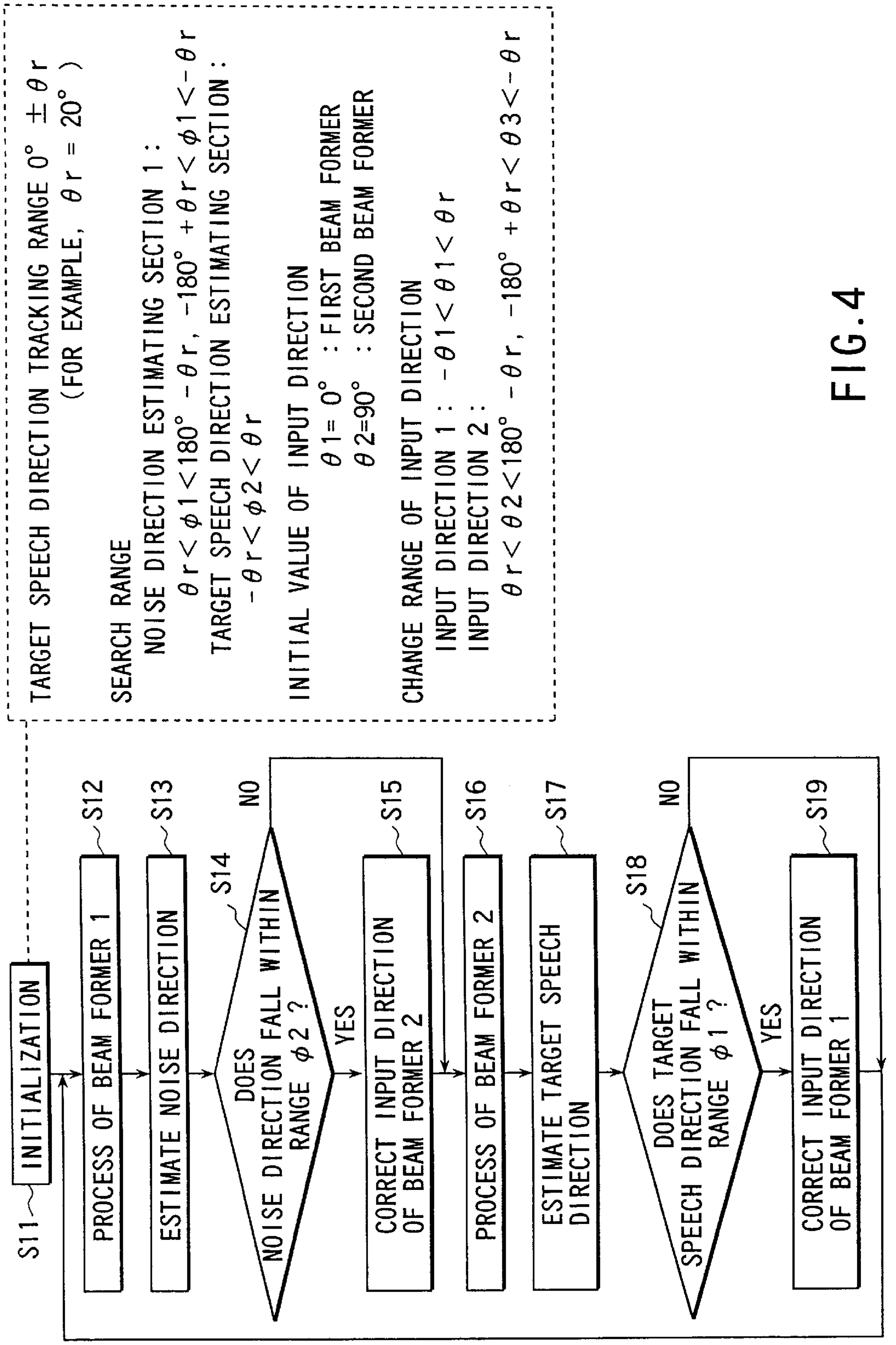
FIG. 4 is a flow chart for explaining the operation of the system in the first embodiment of the present invention.

FIG. 4 shows the processing system of the overall system according to the first embodiment. This processing is done in units of frames.

First, initialization is done (step S11). As the initialization contents, the tracking range of the target speech direction is set at 0°±θr (e.g., θr=20°), the search range of the noise direction estimating section is set to be:

$$\theta r < \phi 1 < 180° - \theta r$$

$$-180° \pm \theta r < \phi 1 < -\theta r$$

and, the search range of the target speech direction estimating section 18 is set to be:

$$-\theta r < \phi 2 < \theta r$$

The initial value of the input direction of the target speech is set at θ1=0°, and the initial value of the input direction of noise is set at θ2=90°.

Upon completion of initialization, the process of the first beam former 13 is executed (step S12), and the noise direction is estimated (step S13). If the noise direction falls within the range ϕ2, the input direction of the second beam former 16 is corrected (steps S14 and S15); otherwise, the input direction is not corrected (step S14).

The process of the second beam former 16 is then executed (step S16), and the target speech direction is estimated (step S17). If the estimated target speech direction falls within the range ϕ1, the input direction of the first beam former 13 is corrected (steps S18 and S19); otherwise, the flow advances to the process of the next frame without correcting the input direction.

The first embodiment is characterized by using beam formers which operate in the frequency domain, thereby greatly reducing the computation amount.

As described above, according to this embodiment, the speech input section receives speech uttered by the speaker at two or more different positions, and the frequency analyzer section frequency-analyzes the received speech signals in units of channels of speech signals corresponding to the speech receiving positions and outputs frequency components for a plurality of channels. The first beam former processor section obtains target speech components by executing arrival noise suppression processing which suppresses speech components other than the speech from the speaker direction by adaptive filtering of the frequency components for the plurality of channels obtained by the frequency analyzer section using filter coefficients, which are calculated to decrease sensitivity levels in directions other than a desired direction. On the other hand, the second beam former processor section obtains noise components by suppressing the speech from the speaker direction by adaptive filtering the frequency components for the plurality of channels obtained by the frequency analyzer section using filter coefficients, which are calculated to decrease sensitivity levels in directions other than a desired direction. The noise direction estimating section estimates the noise direction from the filter coefficients calculated by the first beam former processor section, and the target speech direction estimating section estimates the target speech direction from those calculated by the second beam former processor section. Since the target speech direction correcting section corrects the first input direction as the arrival direction of the target speech to be input in the first beam former on the basis of the target speech direction estimated by the target speech direction estimating section, as needed, the first beam former suppresses noise components coming from directions other than the first input direction, and extracts the speech components of the speaker with low noise. On the other hand, since the noise direction correcting section corrects the second input direction as the arrival direction of noise to be input in the second beam former on the basis of the noise direction estimated by the noise direction estimating section, as needed, the second beam former suppresses components coming from directions other than the second input direction, and extracts noise components after the speech components of the speaker are suppressed.

In this manner, the system of this embodiment can separately obtain speech frequency components from which noise components are suppressed, and noise frequency components from which speech components are suppressed, and the major characteristic feature of the present invention lies in that a beam former which operates in the frequency domain is used as the first and second beam formers. With this feature, the computation amount can be greatly reduced.

According to the present invention, the processing amount of the adaptive filter can be greatly reduced, and frequency analysis other than that for input speech can be omitted. In addition, conversion from the time domain to frequency domain, which was required in conventional filtering, can be omitted, and the overall computation amount can be greatly reduced.

More specifically, in the prior art, in order to suppress spread noise which cannot be suppressed by a beam former, spectrum subtraction (to be abbreviated as SS hereinafter) is done after beam former processing, and requires frequency analysis such as FFT (fast Fourier transform) and the like since it uses a frequency spectrum as an input. However, when a beam former which operates in the frequency domain is used, since the beam former outputs a frequency spectrum, that spectrum can be used in SS. Hence, the conventional FFT step which calculates FFTs exclusively for SS can be omitted. As a result, the overall computation amount can be greatly reduced.

Also, the need for conversion from the time domain to the frequency domain, which is required upon estimating a direction using the filter of a beam former can be obviated, and the overall computation amount can be greatly reduced.

The second embodiment which can attain high-precision tracking even when a noise source has moved across the range of the target speech direction will be explained below.

Figure 5:
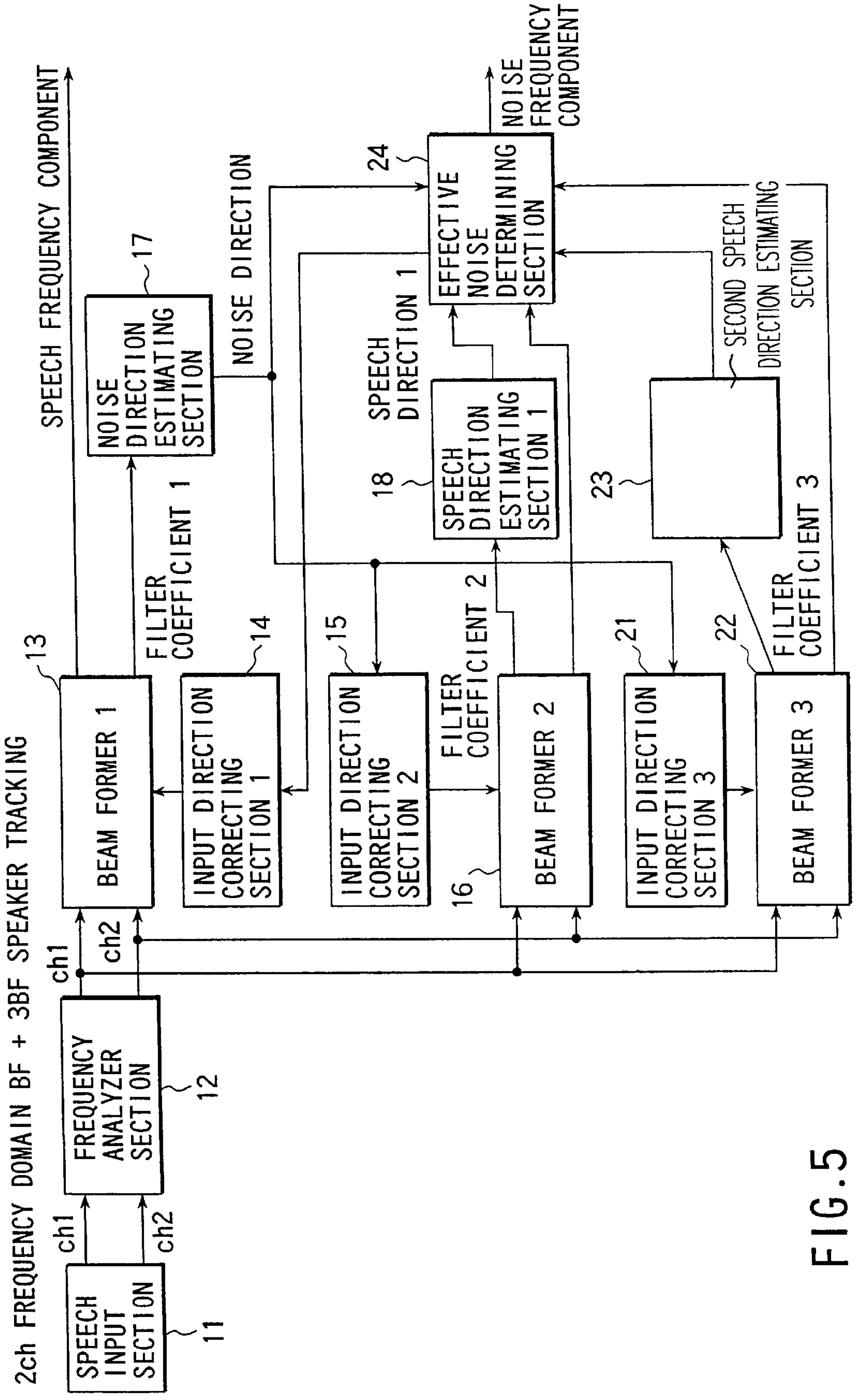
FIG. 5 is a block diagram showing the overall arrangement of the second embodiment of the present invention.

This embodiment will describe an example wherein two beam formers which track a noise source to attain high-precision tracking even when the noise source has moved across the range of the target speech direction, with reference to FIG. 5. According to the embodiment shown in FIG. 5, the apparatus comprises a speech input section 11, frequency analyzer section 12, first beam former 13, first input direction correcting section 14, second input direction correcting section 15, second beam former 16, noise direction estimating section 17, first speech direction estimating section (target speech direction estimating section) 18, third input direction correcting section 21, third beam former 22, second speech direction estimating section 23, and effective noise determining section 24.

Of these sections, the third input direction correcting section 21 has a function of correcting the input direction of the third beam former 22 to make it coincide with the noise direction. The third input direction correcting section 21 generates an output for correcting a third input direction as the arrival direction of noise to be input in the third beam former 22 on the basis of the noise direction estimated by the noise direction estimating section 17, as needed, and supplies it to the third beam former 22. More specifically, the third input direction correcting section 21 converts data corresponding to the estimation amount output from the noise direction estimating section 17 into angle information of the current target noise source direction, and outputs it as target angle information α to the third beam former 22.

The third beam former 22 extracts frequency spectrum components from the noise source direction using frequency component outputs for a plurality of channels from the frequency analyzer section 12 (in this case, frequency spectrum data of speech signals of ch1 and ch2). More specifically, the third beam former 22 is a processor section, which extracts frequency spectrum component data from the noise source direction by executing suppression processing of frequency spectrum components from directions other than the noise source direction by means of adaptive filtering which adjusts the sensitivity levels of frequency components (frequency spectrum data) of 1ch and 2ch in units of directions. The third beam former 22 adopts the arrangement described above with reference to FIG. 2A as in the first and second beam formers 13 and 16.

The second speech direction estimating section 23 has the same function as that of the target speech direction estimating section (speech direction estimating section) 18, and executes a process for estimating the target speech direction on the basis of filter coefficients calculated by the third beam former 22. More specifically, the second speech direction estimating section 23 estimates the speech direction from the filter coefficients of an adaptive filter in the third beam former 22, and outputs data corresponding to that estimation amount.

The effective noise determining section 24 determines based on information of the speech directions and noise direction estimated by the speech direction estimating sections 18 and 23 and noise direction estimating section 17 which of the second and third beam formers 16 and 22 is effectively tracking noise, and outputs the output from the beam former, which is determined to be effectively tracking noise, as noise components. Since other sections which are common to those in the arrangement shown in FIG. 1 are denoted by the same reference numerals as in FIG. 1, a detailed description thereof will not be repeated here (refer to the previous description).

As can be seen from FIG. 5, the second embodiment is different from the first embodiment in which the third input direction correcting section 21, third beam former 22, second speech direction estimating section 23, and effective noise determining section 24 are added.

The outputs from the second and third beam formers 16 and 22, the output from the noise direction estimating section 17, and the outputs from the first and second speech direction estimating sections 18 and 23 are passed to the effective noise determining section 24, and the output from the effective noise determining section 24 is passed to the first input direction correcting section.

The operation of this system with the above arrangement will be explained below.

The speech input section 11 having a plurality of microphones (in this embodiment, the speech input section 11 having two, i.e., first and second microphones m1 and m2) receives speech signals of channels ch1 and ch2. The speech signals for two channels (ch1, ch2) input from the speech input section 11 (i.e., the first channel ch1 corresponds to the speech signal from the first microphone m1, and the second channel ch2 corresponds to the speech signal from the second microphone m2) are sent to the frequency analyzer section 12, which obtains frequency components (frequency spectrum data) in units of channels by, e.g., the fast Fourier transform (FFT) or the like.

The frequency components in units of channels obtained by the frequency analyzer section 12 are respectively supplied to the first, second, and third beam formers 13, 16, and 22.

In the first beam former 13, the frequency components for two channels are adjusted to a phase corresponding to the direction of the target speech, and are then processed by the adaptive filter in the frequency domain by the aforementioned scheme, thus suppressing noise, and outputting the frequency components in the direction of the target speech. More specifically, the first input direction correcting section 14 supplies the following angle information (α) to the first beam former 13. That is, the first input direction correcting section 14 supplies to the first beam former 13, as an input direction correcting amount, angle information (α) required for adjusting the input phases of the frequency components for two channels to make the direction of the target speech apparently coincide with the front direction of each microphone using the output supplied from the speech direction estimating section 18, using the output from the speech direction estimating section 18 or 23 received via the effective noise determining section 24.

As a result, the first beam former 13 corrects the target speech direction in correspondence with this correcting amount, and suppresses speech components coming from directions other than the target speech direction, thereby suppressing noise components and extracting the target speech.

That is, the second and third beam formers 16 and 22 adjust phase to noise, since their target speech is noise. As a result, the second and third beam formers 16 and 22 process the speaker speech source as a noise source, and the internal adaptive filters of these beam formers extract speech from the speaker speech source. Hence, information which reflects the direction of the speaker speech source is obtained from parameters of the adaptive filters in the second and third beam formers 16 and 22.

When the first or second speech direction estimating section 18 or 23 estimates the noise source direction using the parameters of the adaptive filter in the second or third beam former 16 or 22, the estimated direction reflects the direction of the speaker speech source as the target speech. Hence, the first or second speech direction estimating section 18 or 23 generates an output which reflects the parameters of the adaptive filter in the second and third beam former 16 or 22, and the first input direction correcting section 14 generates an input direction correcting amount (α) in correspondence with this output. When the target speech direction in the first beam former 13 is corrected in correspondence with this correcting amount, the first beam former 13 suppresses speech components coming from directions other than the target speech direction. In this case, speech components from the speaker speech source can be extracted.

On the other hand, as the parameters of the adaptive filter of the first beam former 13 are controlled to extract noise components, the noise direction estimating section 17 estimates the noise direction based on these parameters, and supplies that information to the second and third input direction correcting sections 15 and 21 and effective noise determining section 24.

Upon receiving the output from the noise direction estimating section 17, the second input direction correcting section 15 generates an input direction correcting amount ($\alpha$) corresponding to the output from the noise direction estimating section 17. When the target speech direction in the second beam former 16 is corrected in accordance with this correcting amount, the second beam former 16 suppresses speech components from directions other than the target speech direction. In this case, noise components as components from directions other than the speaker speech source can be extracted.

At this time, since the parameters of the adaptive filter of the second beam former 16 are controlled to extract speech components of the speaker as the target speech, the first speech direction estimating section 18 can estimate the speech direction of the speaker using these parameters. The first speech direction estimating section 18 supplies that estimated information to the effective noise determining section 24.

On the other hand, the output from the noise direction estimating section 17 is also supplied to the third input direction correcting section 21. Upon receiving this output, the third input direction correcting section 21 generates an input direction correcting amount ($\alpha$) in correspondence with the output from the noise direction estimating section 17, and supplies it to the third beam former 22. The third beam former 22 corrects its target speech direction in correspondence with the received correcting amount. Since the third beam former 22 suppresses speech components coming from directions other than the target speech direction, components from directions other than the speaker speech source, i.e., noise components can be extracted.

At this time, since the parameters of the adaptive filter of the third beam former 22 are controlled to extract speech components of the speaker as the target speech, the second speech direction estimating section 23 can estimate the speech direction of the speaker based on these parameters. The estimated information is supplied to the effective noise determining section 24.

Based on the estimation information of the speech directions of the speaker received from the first and second speech direction estimating sections 18 and 23, and the estimation information of the noise direction received from the noise direction estimating section 17, the effective noise determining section 24 determines which of the second and third beam formers 16 and 22 is effectively tracking noise. Based on this determination result, the parameters of the adaptive filter in the beam former, which is determined to be effectively tracking noise, are supplied to the first input direction correcting section 14. For this reason, the first input direction correcting section 14 generates an output which reflects the parameters, and generates an input direction correcting amount ($\alpha$) corresponding to this output. Since the target speech direction in the first beam former 13 is corrected in correspondence with this correcting amount, the first beam former 13 suppresses speech components coming from directions other than the target speech direction. In this case, components from the speaker speech source can be extracted. In addition, when noise components coming from a noise source which is moving over a broad range are to be removed, the moving noise source can be reliably detected without failure, and noise components can be removed.

Figure 6:
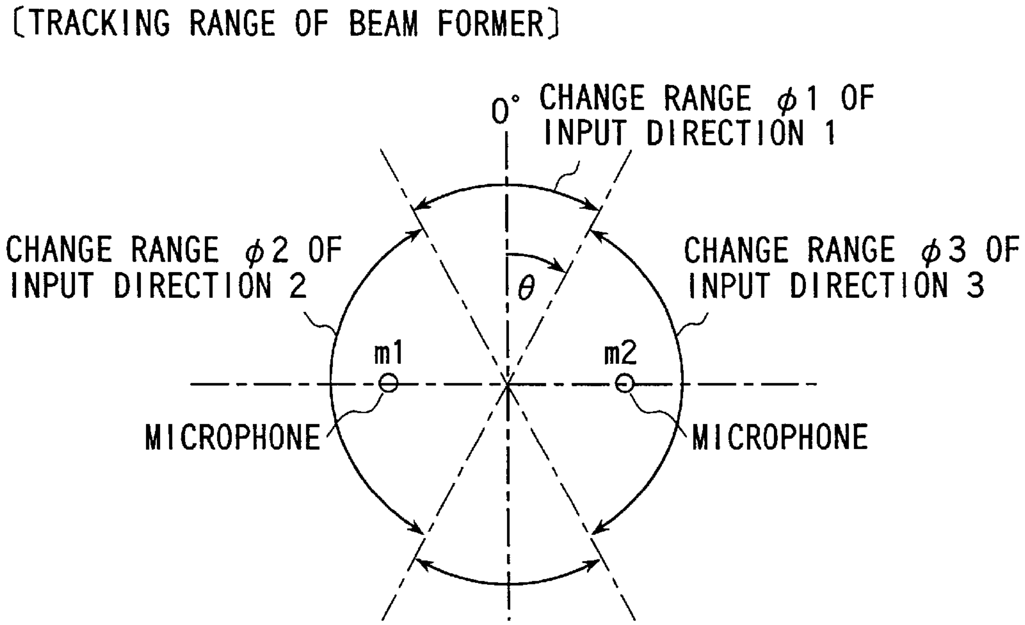
FIG. 6 is a chart for explaining the tracking range of a beam former in the second embodiment of the present invention.

More specifically, in this embodiment, the first beam former 13 is provided to extract speech frequency components of the speaker, and the second and third beam formers 16 and 22 are provided to extract noise frequency components. Assuming that the speaker is located in the 0° direction when viewed from the observation point, and need be monitored within the angle range of $0°\pm\theta$, as shown in FIG. 6, a change range $\phi1$ of the first beam former 13, which is provided to extract speech frequency components of the speaker, i.e., a change range in 1° increments for the direction to set a high sensitivity level in the adaptive filter, can be set to at most satisfy:

$$-\theta<\phi1<\theta$$

and filtering is done within this range. In this case, of the second and third beam formers 16 and 22 which are provided to extract noise frequency components, a change range $\phi2$ of the second beam former 16 is set to satisfy:

$$-180°+\theta<\phi2<-\theta$$

and a change range $\phi3$ of the third beam former 22 is set to satisfy:

$$\theta<\phi3<180°-\theta$$

Note that 180° indicate the counter position of 0° via the central point, "−" indicates the counterclockwise direction in FIG. 6 when viewed from the 0° position, and "+" indicates the clockwise direction. Therefore, with this arrangement, the second and third beam formers 16 and 22 track noise components coming from different ranges which sandwich the target speech arrival range $\phi1$ therebetween. For this reason, even when a noise source, which was present within the range $\phi2$, has abruptly moved to a position within the range $\phi3$ across the range $\phi1$, the third beam former 22 can immediately detect the noise source which has come into its range. Hence, the noise direction can be prevented from missing.

In case of the above arrangement, a total of two outputs, i.e., the outputs from the second and third beam formers 16 and 22, are obtained as noise outputs. However, the effective noise determining section 24 determines based on the result of the noise direction estimating section 17 which of the second and third beam formers 16 and 22 is effectively tracking noise, and uses the output from the beam former which is effectively tracking noise as noise components, on the basis of its determination result.

Figure 7:
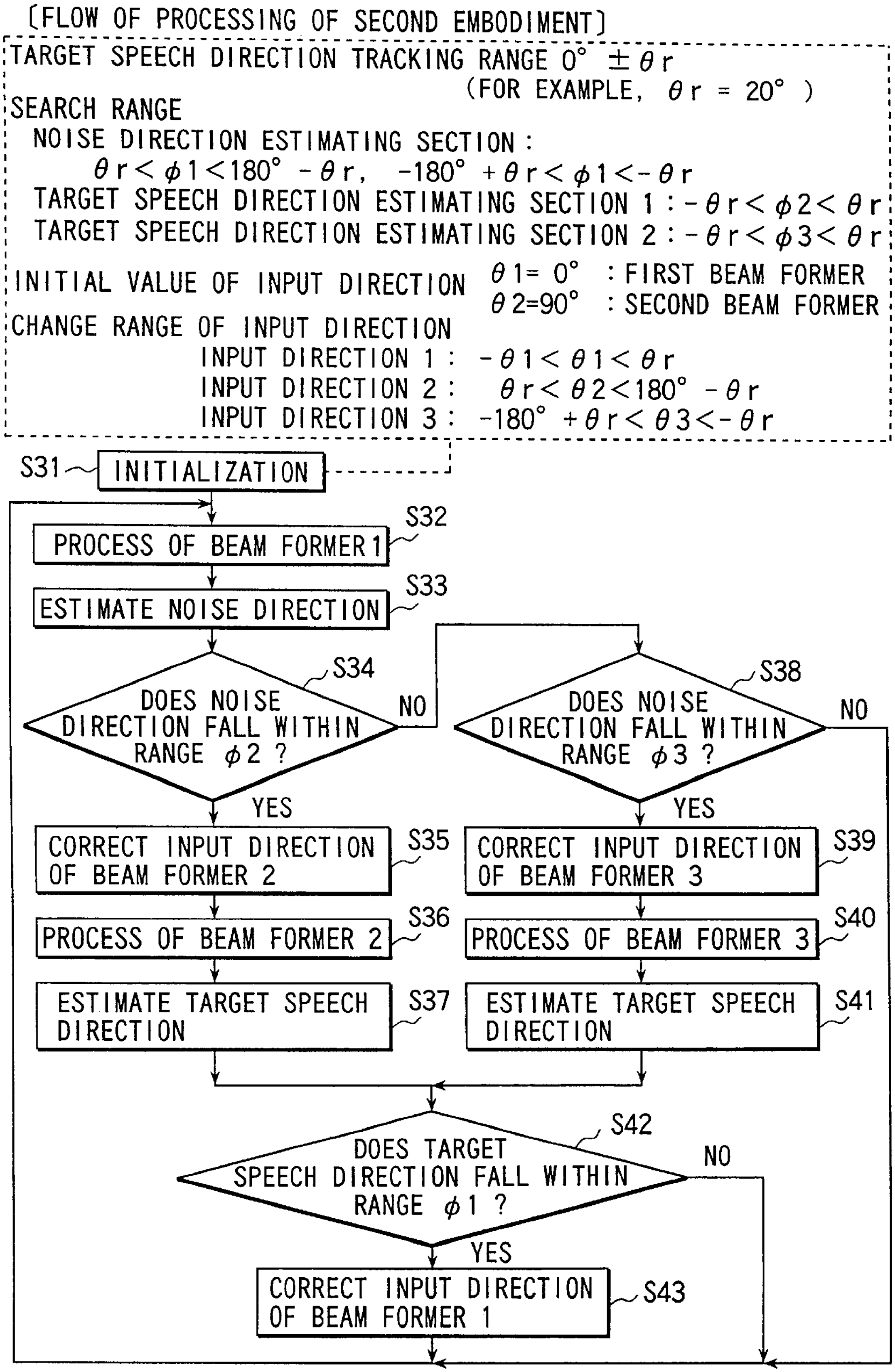
FIG. 7 is a flow chart for explaining the operation of the system in the second embodiment of the present invention.

FIG. 7 shows the overall flow of the aforementioned processing. This processing is done in units of frames. After the initial values of the change ranges and input directions of the respective beam formers are set (step S31), the process of the first beam former 13 is executed (step S32). After the noise direction is estimated (step S33), the effective noise determining section 24 determines based on that noise direction if the noise direction falls within the range $\phi2$ or $\phi3$, thus selecting one of the second and third beam formers 16 and 22 (step S34).

The information of the estimated noise direction is supplied to one of the second and third input direction correcting sections 15 and 21 to correct the noise direction, and the process of the selected beam former is executed.

More specifically, if the estimated noise direction falls within the range $\phi2$, the information of the noise direction is sent to the second input direction correcting section 15 to correct the noise direction, and the process of the second beam former 16 is executed to estimate the target speech direction (steps S34, S35, S36, and S37).

On the other hand, if the estimated noise direction falls within the range φ3, the information of the noise direction is sent to the third input direction correcting section 21 to correct the noise direction, and the process of the third beam former 22 is executed to estimate the target speech direction (steps S34, S38, S39, S40, and S41).

It is then checked if the speech direction (target speech direction) estimated by the selected beam former falls with the range φ1. If the speech direction falls within that range, the information of the estimated speech direction is supplied to the first input direction correcting section 14 for the first beam former 13 to correct the input direction (steps S42 and S43). If the speech direction falls outside the range φ1, correction is not executed, and the flow advances to the processes for the next frame (steps S42 and S31).

This processing is done in units of frames, and noise suppression is done while tracking the speech and noise directions.

In the systems of the first and second embodiments described above, noise components having a direction can be mainly suppressed while reducing the computation load. Such system is suitable for use in a specific environment such as a teleconference system, in which the location of each speaker speech source is known in advance, and environmental noise is small, but cannot be used in noisy environments such as outdoors influenced by various kinds of noise components having different levels and characteristics, or shops and railway stations where many people gather.

Therefore, the third embodiment which can effectively suppress directionless background noise components will be explained below.

The third embodiment will explain a system capable of high-precision noise suppression, i.e., which suppresses directional noise components by a beam former, and suppresses directionless background noise components by spectrum subtraction (SS).

Figure 8:
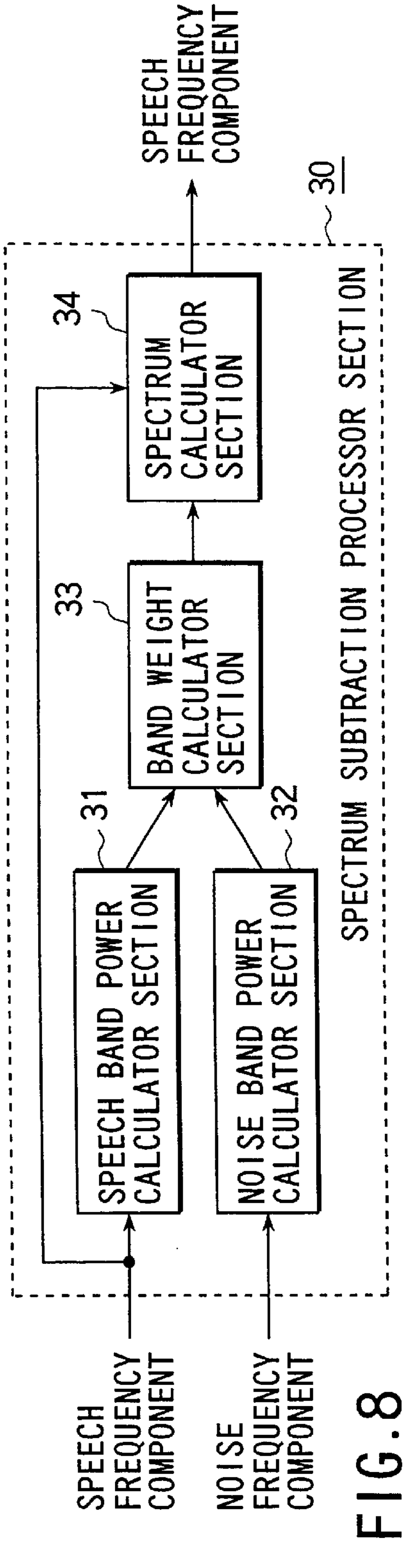
FIG. 8 is a block diagram showing the arrangement of principal part of the third embodiment of the present invention.

The system of the third embodiment is constructed by connecting a spectrum subtraction (SS) processor section 30 with the arrangement shown in FIG. 8 to the output stage of the system with the arrangement shown in FIG. 1 or 5. As shown in FIG. 8, the spectrum subtraction (SS) processor section 30 comprises a speech band power calculator section 31, noise band power calculator section 32, band weight calculator section 33, and spectrum calculator section 34.

Of these sections, the speech band power calculator section 31 calculates speech power for each band by dividing the speech frequency components obtained by the beam former 13 in units of frequency bands. The noise band power calculator section 32 calculates noise power for each band by dividing noise frequency components obtained by the beam former 16 (or noise frequency components output from the beam former 16 or 22 selected by the effective noise determining section 24) in units of frequency bands.

The band weight calculator section 33 calculates band weight coefficients W(k) in units of bands using average speech band power levels Pv(k) and average noise band power levels Pn(k) obtained in units of bands. The spectrum calculator section 34 suppresses background noise components by weighting in units of frequency bands of speech signals on the basis of the speech band power levels calculated by the speech band power calculator section 31.

The speech frequency components used in the speech band power calculator section 31, and the noise frequency components used in the noise band power calculator section 32, use the target speech components and noise components as the outputs from the two beam formers in the first or second embodiments. Directionless background noise components are suppressed by noise suppression processing generally known as spectrum subtraction (SS).

Since conventional spectrum subtraction (SS) uses a microphone for one channel (i.e., a single microphone), and estimates noise power in a non-vocal activity period from the output from this microphone, it cannot cope with non-steady noise components superposed on speech components.

On the other hand, when microphones for two channels (e.g., two microphones) are used, and are respectively used for collecting noise components, and noise-superposed speech components, the two microphones must be placed at separate positions. As a result, the phase of noise components superposed on speech components shifts from that of noise components received by the noise collecting microphone, and the noise suppression effect of spectrum subtraction cannot be improved largely.

In this embodiment, a beam former which extracts noise components is prepared, and its output is used. Hence, as has been described in the first and second embodiments, phase shift can be corrected, and spectrum subtraction (SS) which can assure high precision even for non-steady noise can be realized.

Furthermore, since the output from a beam former in the frequency domain is used, spectrum subtraction can be done without frequency analysis, and non-steady noise can be suppressed by a smaller computation amount than the conventional system.

An example of the spectrum subtraction (SS) method will be explained below.

The principle of spectrum subtraction will be described first.

Let Pv be the output from a target speech beam former (first beam former 13), and Pn be the output from a noise beam former (second or third beam former 16 or 22). Then, Pv and Pn are respectively given by:

$$Pv=V+B'$$

$$Pn=N+B''$$

where V is the power of speech components, B' is the power of background noise components contained in the speech output, N is the power of noise source components, and B" is the power of background noise components contained in the noise output. Of these components, the background noise components contained in the speech output components are suppressed by spectrum subtraction.

B' in the speech output components is equivalent to B" in the noise output components, and if the power N of the noise source components is smaller than the power V of the speech components, B'=Pn holds, and a weight coefficient for spectrum subtraction (SS) can be obtained as follows. That is, W is given by:

$$W=(Pv-Pn)/Pv\cong V/(V+B')$$

The speech components can be obtained by approximation:

$$V\cong Pv*W$$

Figure 9:
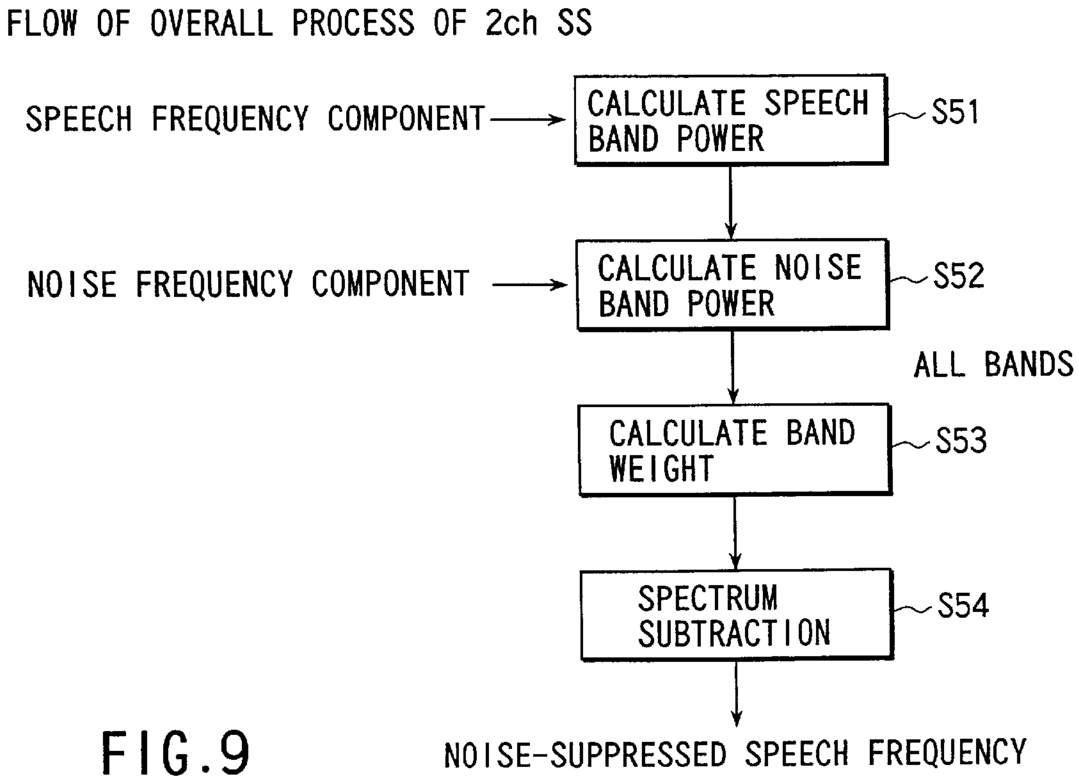
FIG. 9 is a flow chart for explaining the operation of the system in the third embodiment of the present invention.

FIG. 8 shows an arrangement required for spectrum subtraction (SS), and FIG. 9 shows the spectrum subtraction processing sequence.

Speech and noise frequency components are obtained as the outputs from the two beam formers 13 and 16 (or 22). Speech band power calculations are made using the speech frequency components as the output from the beam former 13 (step S51), and noise band power calculations are made using the noise frequency components as the output from the beam former 16 (or 22) (step S52). These power calculations use the speech and noise frequency components obtained by the system of the present invention, which has been described in the first and second embodiments. Since the beam former processing is done in the frequency domain to obtain these components, the power calculations can be executed in units of bands of the speech and noise frequency components without any frequency analysis.

The calculated power values are averaged in the time domain to obtain average power for each band (step S53). The band weight calculator section 33 calculates a band weight coefficient W(k) using average speech band power Pv (k) and average noise band power Pn(k) obtained for each band k by:

$$W(k)=(Pv(k)-Pn(k))/Pv(k) \text{ (when } Pv(k)>Pn(k))$$

$$W(k)=W\min \text{ (when } Pv(k)\leqq Pn(k))$$

The band weight assumes a value between a maximum value=1.0, and a minimum value Wmin, which is set at, e.g., "0.01".

By weighting input speech frequency components Pv(k) using the weight coefficients W(k) in units of bands calculated by the band weight calculator section 23 (step S54), the spectrum calculator section 24 calculates noise-suppressed speech frequency components Pv(k)':

$$Pv(k)'=Pv(k)*W(k)$$

In this manner, directionless background noise is suppressed by spectrum subtraction (SS), and directional noise is suppress ed by the aforementioned beam former, thus consequently achieving high-precision noise suppression.

As described above, according to the third embodiment, the frequency and noise frequency components obtained by the noise suppression apparatus of the first or second embodiment are used, and a spectrum subtraction noise suppression section which comprises a speech band power calculator section for calculating speech power in units of bands by dividing the obtained speech frequency components in units of frequency bands, a noise band power calculator section for calculating noise power in units of bands by dividing the obtained noise frequency components in units of frequency bands, and a spectrum calculator section for suppressing background noise by weighting in units of frequency bands of speech signals on the basis of the speech and noise frequency band power values obtained by the speech and noise band power calculator sections, is added to the noise suppression apparatus of the first or second embodiment.

In case of this arrangement, the speech band power calculator section calculates speech power for each band by dividing the obtained speech frequency spectrum components in units of frequency bands, and the noise band power calculator section calculates noise power for each band by dividing the obtained noise frequency spectrum components in units of frequency bands. The spectrum calculator section suppresses background noise by weighting in units of frequency bands of speech signals on the basis of the speech and noise frequency band power values obtained by the speech and noise band power calculator sections.

According to this arrangement, directionless noise (background noise) which cannot be suppressed by a conventional beam former is suppressed by spectrum subtraction using the target speech components and noise components, which can be obtained by the beam formers in the system of the present invention. More specifically, the system of the present invention comprises two beam formers for respectively extracting target speech components and noise components. By executing spectrum subtraction using the target speech components and noise components as the outputs from these beam formers, directionless background noise components are suppressed. Spectrum subtraction is known as noise suppression processing. However, since conventional spectrum subtraction (SS) uses a microphone for one channel (i.e., a single microphone), and estimates noise power in a non-vocal activity period from the output from this microphone, it cannot cope with non-steady noise components superposed on speech components. On the other hand, when microphones for two channels (e.g., two microphones) are used, and are respectively used for collecting noise components, and noise-superposed speech components, the two microphones must be placed at separate positions. As a result, the phase of noise components superposed on speech components shifts from that of noise components received by the noise collecting microphone, and the noise suppression effect of spectrum subtraction cannot be improved largely.

However, according to the present invention, a beam former which extracts noise components is prepared, and its output is used. Hence, phase shift can be corrected, and spectrum subtraction which can assure high precision even for non-steady noise can be realized. Furthermore, since the output from the beam former in the frequency domain is used, spectrum subtraction can be done without frequency analysis, and non-steady noise can be suppressed by a smaller computation amount than the conventional system.

The fourth embodiment which can further improve the precision of the third embodiment will be described below.

The fourth embodiment can further improve the precision of noise suppression by correcting power of noise components in spectrum subtraction (SS) of the third embodiment. More specifically, since the third embodiment is achieved on the condition of the small power N of the noise source, spectrum subtraction (SS) inevitably increases distortion in speech components on which noise source components are superposed.

In the fourth embodiment, the band weight calculation results of spectrum subtraction are corrected using the power of the input signal.

Let Pv be the speech output power, V be the power of speech components, B' be the background noise power contained in the speech output, Pn be the noise output power, N be the power of noise source components, B" be the background noise components contained in the noise output, and Px be the power of a non-suppressed input signal. Then, Px, Pv, and Pn are respectively given by:

$$Px=V+N+B$$

$$Pv=V+B'$$

$$Pn=N+B''$$

Assuming that B≅B'≅B", the power Pb of true background noise components is given by:

$$\begin{aligned}Pb&=Pv+Pn-Px\\&=V+B'+N+B''-(V+N+B)\\&=B'+B''-B\\&=B\end{aligned}$$

The weight of spectrum subtraction (SS) using this noise power can be calculated by:

$$W=(Pv-Pb)/Pv$$

$$=(Px-Pn)/Pv$$

Even when background noise is non-steady noise and N is large, SS processing which suffers less distortion can be implemented.

Figure 10:
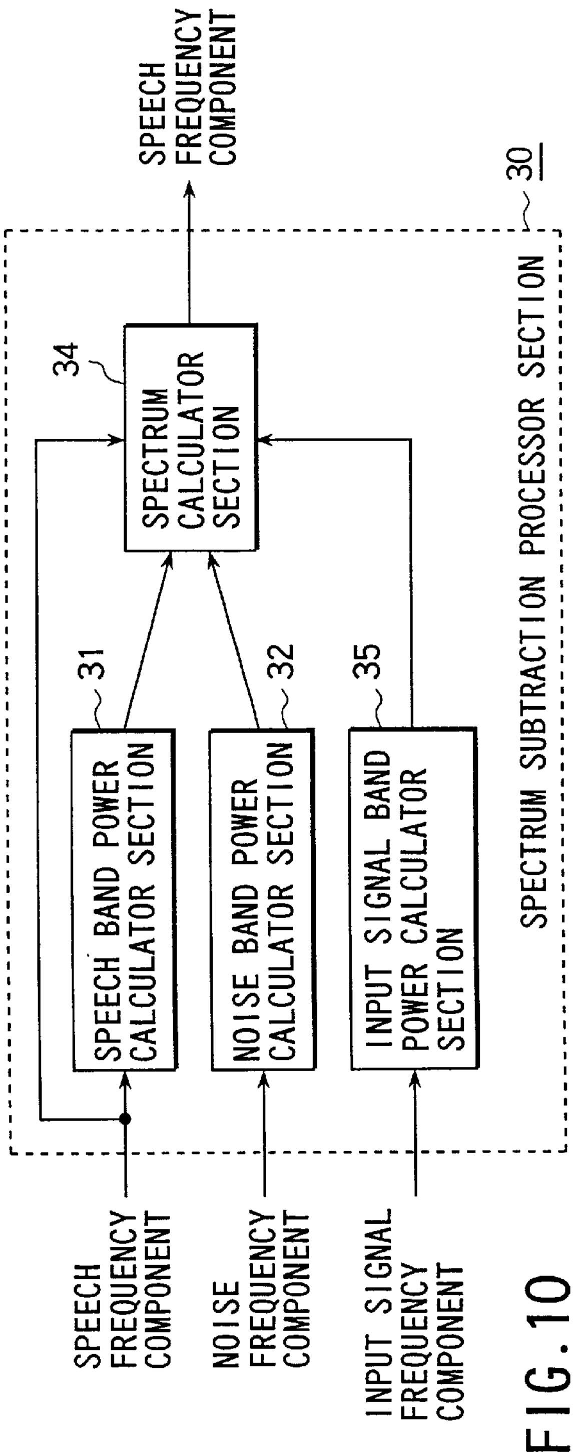
FIG. 10 is a block diagram showing the arrangement of principal part of the fourth embodiment of the present invention.
Figure 11:
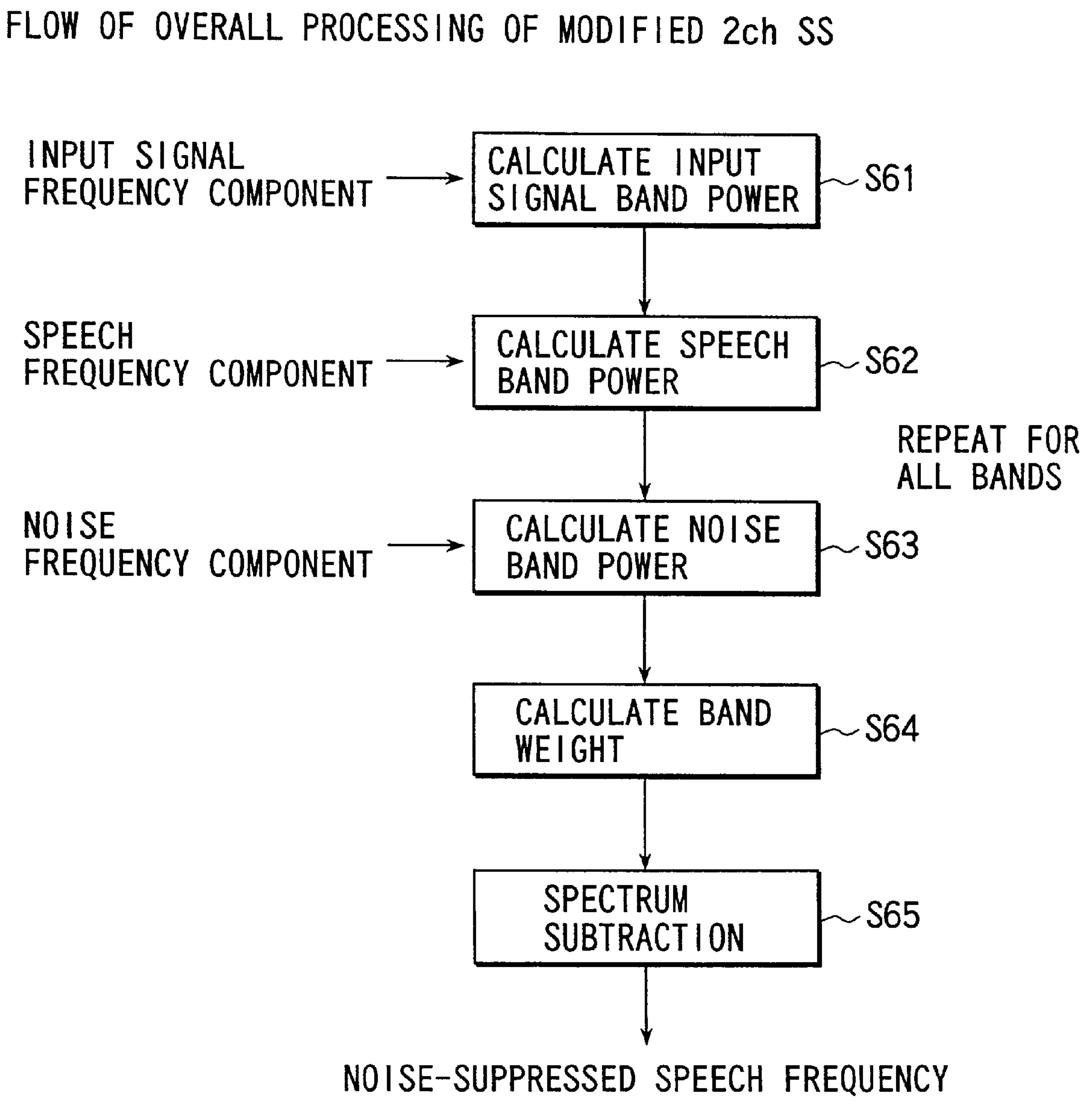
FIG. 11 is a flow chart for explaining the operation of the system in the fourth embodiment of the present invention.

FIG. 10 shows the arrangement of this embodiment, and FIG. 11 shows the flow of the processing. According to the arrangement shown in FIG. 10, a speech band power calculator section 31, noise band power calculator section 32, spectrum calculator section 34, and input signal band power calculator section 35 are provided.

Of these sections, the speech band power calculator section 31 calculates speech power for each band by dividing the speech frequency components obtained by the beam former 13 in units of frequency bands. The noise band power calculator section 32 calculates noise power for each band by dividing in units of frequency bands noise frequency components which are obtained by the beam former 16 or 22, and selected and output by the effective noise determining section 24.

The input signal band power calculator section 35 calculates input power for each band by dividing frequency spectrum components of input signals obtained from the frequency analyzer section 12. The spectrum calculator section 34 suppresses background noise by weighting in units of frequency bands of speech signals on the basis of the input band power calculated by the input signal band power calculator section 35, the speech band power calculated by the speech band power calculator section 31, and the noise band power calculated by the noise band power calculator section 32.

The difference between the spectrum subtraction (SS) section 30 in the fourth embodiment shown in FIG. 10, and that of the spectrum subtraction (SS) section in the third embodiment is that the fourth embodiment uses frequency components of non-suppressed input signals.

As for the input signal frequency components, the input signal band power calculator section 35 calculates power for each band in the same manner as the speech or noise frequency components from the beam former (step S61).

As in the third embodiment, since the speech and noise frequency components as the outputs from the two beam formers 13 and 16 (or 22) are supplied, the speech band power calculator section 31 calculates speech band power using the speech frequency components as the output from the beam former 13 (step S62), and the noise band power calculator section 32 calculates noise band power using the noise frequency components as the output from the beam former 16 (or 22) (step S63).

The spectrum calculator section 34 calculates the weight coefficients, as described above, and then weights frequency components (steps S64 and S65). In this way, only speech components from which directional noise components and directionless noise components are suppressed, and which suffer less distortion, can be extracted.

As described above, in the fourth embodiment, the input signal band power calculator section which calculates input power for each band by dividing the frequency components of input signals obtained by frequency-analyzing the input signals obtained from the speech input section in units of frequency bands is provided. The spectrum calculator executes a process for suppressing background noise by weighting in units of frequency bands of speech signals on the basis of the input band power, speech band power, and noise band power.

In case of this arrangement, the speech band power calculator section calculates speech power for each band by dividing the obtained speech frequency spectrum components in units of frequency bands, and the noise band power calculator section calculates noise power for each band by dividing the obtained noise frequency spectrum components in units of frequency bands. The input signal band power calculator section receives frequency spectrum components of the input speech obtained by frequency-analyzing the input signals obtained from the speech input section, and calculates input power for each band by dividing the received frequency spectrum components in units of frequency bands. The spectrum calculator section suppresses background noise by weighting in units of frequency bands of speech signals on the basis of the input signal, speech, and noise frequency band power values obtained by the input signal, speech, and noise band power calculator sections.

In the fourth embodiment, since the power of noise components is corrected in spectrum subtraction in the arrangement of the third embodiment, noise suppression can be done with higher precision. More specifically, since the third embodiment assumes small power N of the noise source, spectrum subtraction inevitably increases distortion in speech components on which noise source components are superposed. However, in this embodiment, the band weight calculation results of spectrum subtraction are corrected using the power of the input signal.

In this manner, only speech components from which directional noise components and directionless noise components are suppressed, and which suffer less distortion, can be extracted.

Various embodiments of the present invention have been described. In other words, the first invention provides a noise suppress processing apparatus comprising: a speech input section for receiving speech uttered by a speaker at least at two different positions; a frequency analyzer section for outputting frequency components for a plurality of channels by frequency-analyzing speech signals corresponding to the speech receiving positions in units of channels; a first beam former processor for obtaining target speech components by executing arrival noise suppression processing which suppresses speech components other than speech from a speaker direction by adaptive filtering of the frequency components for the plurality of channels obtained by the frequency analyzer section using filter coefficients, which are calculated to decrease sensitivity levels in directions other than a desired direction; a second beam former processor section for obtaining noise components by suppressing the speech from the speaker direction by adaptive filtering of the frequency components for the plurality of channels obtained by the frequency analyzer section using filter coefficients, which are calculated to decrease sensitivity levels in directions other than a desired direction; a noise direction estimating section for estimating a noise direction from the filter coefficients calculated by the first beam former processor section; a target speech direction estimating section for estimating a target speech direction from the filter coefficients calculated by the second beam former processor section; a target speech direction correcting section for correcting a first input direction as an arrival direction of target speech to be input in the first beam former processor section on the basis of the target speech direction estimated by the target speech direction estimating section, as needed; and a noise direction correcting section for correcting a second input direction as an arrival direction of noise to be input in the second beam former processor section on the basis of the noise direction estimated by the noise direction estimating section, as needed.

In case of this arrangement, the speech input section receives speech uttered by the speaker at two or more different positions, and the frequency analyzer section frequency-analyzes the received speech signals in units of channels of speech signals corresponding to the speech receiving positions and outputs frequency components for a plurality of channels. The first beam former processor section obtains target speech components by executing arrival noise suppression processing which suppresses speech components other than the speech from the speaker direction by adaptive filtering of the frequency components for the plurality of channels obtained by the frequency analyzer section using filter coefficients, which are calculated to decrease sensitivity levels in directions other than a desired direction. On the other hand, the second beam former processor section obtains noise components by suppressing the speech from the speaker direction by adaptive filtering of the frequency components for the plurality of channels obtained by the frequency analyzer section using filter coefficients, which are calculated to decrease sensitivity levels in directions other than a desired direction. The noise direction estimating section estimates the noise direction from the filter coefficients calculated by the first beam former processor section, and the target speech direction estimating section estimates the target speech direction from those calculated by the second beam former processor section.

Since the target speech direction correcting section corrects the first input direction as the arrival direction of the target speech to be input in the first beam former on the basis of the target speech direction estimated by the target speech direction estimating section, as needed, the first beam former suppresses noise components coming from directions other than the first input direction, and extracts the speech components of the speaker with low noise. On the other hand, since the noise direction correcting section corrects the second input direction as the arrival direction of noise to be input in the second beam former on the basis of the noise direction estimated by the noise direction estimating section, as needed, the second beam former suppresses components coming from directions other than the second input direction, and extracts noise components after the speech components of the speaker are suppressed.

In this fashion, the system of the present invention can separately obtain speech frequency components from which noise components are suppressed, and noise frequency components from which speech components are suppressed. The first characteristic feature of the present invention lies in that a beam former which operates in the frequency domain is used as the first and second beam formers. With this feature, the computation amount can be greatly reduced. According to the present invention, the processing amount of the adaptive filter can be greatly reduced, and frequency analysis other than that for input speech can be omitted. In addition, conversion from the time domain to frequency domain, which was required in conventional filtering, can be omitted, and the overall computation amount can be greatly reduced.

More specifically, in the prior art, in order to suppress diffuse noise which cannot be suppressed by a beam former, spectrum subtraction is done after beam former processing, and requires frequency analysis such as FFT (fast Fourier transform) and the like since it uses a frequency spectrum as an input. However, when a beam former which operates in the frequency domain is used, since the beam former outputs a frequency spectrum, that spectrum can be used in spectrum subtraction. Hence, the conventional FFT step which calculates FFTs exclusively for spectrum subtraction can be omitted. As a result, the overall computation amount can be greatly reduced.

In addition, conversion from the time domain to frequency domain, which was required in direction estimation which uses the filter of a beam former, can be omitted, and the overall computation amount can be greatly reduced.

The second invention provides a noise suppress processing apparatus comprising a speech input section for receiving speech uttered by a speaker at least at two different positions; a frequency analyzer section for outputting frequency components for a plurality of channels by frequency-analyzing speech signals corresponding to the speech receiving positions in units of channels; a first beam former processor for obtaining target speech components by executing arrival noise suppression processing which suppresses speech components other than speech from a speaker direction by adaptive filtering of the frequency components for the plurality of channels obtained by the frequency analyzer section using filter coefficients, which are calculated to decrease sensitivity levels in directions other than a desired direction; a second beam former processor section for obtaining first noise components by suppressing the speech from the speaker direction by adaptive filtering of the frequency components for the plurality of channels obtained by the frequency analyzer section using filter coefficients, which are calculated to decrease sensitivity levels in directions other than a desired direction; a third beam former processor section for obtaining second noise components by suppressing the speech from the speaker direction by adaptive filtering of the frequency components for the plurality of channels obtained by the frequency analyzer section using filter coefficients, which are calculated to decrease sensitivity levels in directions other than a desired direction; a noise direction estimating section for estimating a noise direction from the filter coefficients calculated by the first beam former processor section; a first target speech direction estimating section for estimating a first target speech direction from the filter coefficients calculated by the second beam former processor section; a second target speech direction estimating section for estimating a second target speech direction from the filter coefficients calculated by the third beam former processor section; a first input direction correcting section for correcting a first input direction as an arrival direction of target speech to be input in the first beam former processor section on the basis of one or both of the first target speech direction estimated by the first target speech direction estimating section and the second target speech direction estimated by the second target speech direction estimating section, as needed; a second input direction correcting section for, when the noise direction estimated by the noise direction estimating section falls with a predetermined first range, correcting a second input direction as an arrival direction of noise to be input in the second beam former processor section on the basis of the noise direction, as needed; a third input direction correcting section for, when the noise direction estimated by the noise direction estimating section falls with a predetermined second range, correcting a second input direction as an arrival direction of noise to be input in the third beam former processor section on the basis of the noise direction, as needed; and an effective noise determining section for determining one of the first and second output noise components as true noise output components on the basis of whether the noise direction estimated by the noise direction estimating section falls within the predetermined first or second range and outputting the determined output noise component, and at the same time, determining which estimation result of the first and second speech direction estimating sections is effective and outputting the determined speech direction estimation result to the first input direction correcting section.

In case of the arrangement of the second invention, the speech input section receives speech uttered by the speaker at two or more different positions, and the frequency analyzer section frequency-analyzes the received speech signals in units of channels of speech signals corresponding to the speech receiving positions and outputs frequency components for a plurality of channels. The first beam former processor section obtains target speech components by executing arrival noise suppression processing which suppresses speech components other than the speech from the speaker direction by adaptive filtering of the frequency components for the plurality of channels obtained by the frequency analyzer section using filter coefficients, which are calculated to decrease sensitivity levels in directions other than a desired direction. On the other hand, the second beam former processor section obtains noise components by suppressing the speech from the speaker direction by adaptive filtering of the frequency components for the plurality of channels obtained by the frequency analyzer section using filter coefficients, which are calculated to decrease sensitivity levels in directions other than a desired direction. The noise direction estimating section estimates the noise direction from the filter coefficients calculated by the first beam former processor section, and the target speech direction estimating section estimates the target speech direction from those calculated by the second beam former processor section.

The first target speech direction estimating section estimates the first target speech direction from the filter coefficients calculated by the second beam former processor section, and the second target speech direction estimating section estimates the second target speech direction from the filter coefficients calculated by the third beam former processor section.

The first input direction correcting section corrects the first input direction as the arrival direction of the target speech to be input in the first beam former on the basis of one or both of the first target speech direction estimated by the first target speech direction estimating section and the second target speech direction estimated by the second target speech direction estimating section, as needed. When the noise direction estimated by the noise direction estimating section falls within the predetermined first range, the second input direction correcting section corrects the second input direction as the arrival direction of noise to be input in the second beam former on the basis of the noise direction, as needed. When the noise direction estimated by the noise direction estimating section falls within the predetermined second range, the third input direction correcting section corrects the third input direction as the arrival direction of noise to be input in the third beam former on the basis of the noise direction, as needed.

Hence, the second beam former, whose second input direction is corrected based on the output from the second input direction correcting section, suppresses components coming from directions other than the second input direction, and extracts remaining noise components. The third beam former, whose third input direction is corrected based on the output from the third input direction correcting section, suppresses components coming from directions other than the third input direction, and extracts remaining noise components.

The effective noise determining section determines one of the first and second output noise components as true noise output components on the basis of whether the noise direction estimated by the noise direction estimating section falls within the predetermined first or second range, and outputs the determined noise components. At the same time, the effective noise determining section determines which estimation result of the first and second speech direction estimating sections is effective and outputs the effective speech direction estimation result to the first input direction correcting section.

As a result, since the target speech direction correcting section corrects the first input direction as the arrival direction of the target speech to be input in the first beam former on the basis of the target speech direction obtained by the determined target speech direction estimating section, as needed, the first beam former suppresses noise components coming from directions other than the first input direction, and extracts the speech components of the speaker with low noise.

In this manner, the system of the present invention can separately obtain speech frequency components from which noise components are suppressed, and noise frequency components from which speech components are suppressed. The major characteristic feature of the present invention lies in that a beam former which operates in the frequency domain is used as the first and second beam formers. With this feature, the computation amount can be greatly reduced.

According to the present invention, the processing amount of the adaptive filter can be greatly reduced, and frequency analysis other than that for input speech can be omitted. In addition, conversion from the time domain to frequency domain, which was required in conventional filtering, can be omitted, and the overall computation amount can be greatly reduced.

Furthermore, according to the present invention, noise tracking beam formers having quite different monitoring ranges are used in noise tracking, speech directions are estimated based on their outputs, and which of the beam formers is effectively tracking noise is determined based on the direction estimation results. Then, the estimation result of the speech direction based on filter coefficients of the beam former which is determined to be effective is supplied to the first target speech direction estimating section. Since the first target speech direction estimating section corrects the first input direction as the arrival direction of the target speech to be input in the first beam former on the basis of the target speech direction estimated by the target speech direction estimating section, as needed, the first beam former can suppress noise components coming from directions other than the first input direction, and can extract speech components of the speaker with low noise. Hence, even when the noise source has moved, it can be tracked without failure, and noise can be suppressed.

In the prior art, in order to allow to track a target speech source using only two channels, i.e., two microphones, a noise tracking beam former is used in addition to a noise suppressing beam former. For example, however, when the noise source has moved across the direction of the target speech, noise tracking precision often deteriorates.

However, in the present invention, since a plurality of beam formers which track noise are used to monitor independent tracking ranges, the tracking precision can be prevented from deteriorating even in the aforementioned case.

Furthermore, the third invention of the present invention further comprises, in the first or second noise suppression apparatus, a spectrum subtraction noise suppression section, which includes a speech band power calculator section for calculating speech power for each band by dividing the obtained speech frequency components in units of frequency bands, a noise band power calculator section for calculating noise power for each band by dividing the obtained noise frequency components in units of frequency bands, and a spectrum calculator section for suppressing background noise by weighting in units of frequency bands of speech signals on the basis of the speech and noise power values obtained from the speech and noise band power calculator sections.

In case of this arrangement, the speech band power calculator section calculates speech power for each band by dividing the obtained speech frequency spectrum components in units of frequency bands, and the noise band power calculator section calculates noise power for each band by dividing the obtained noise frequency spectrum components in units of frequency bands. The spectrum calculator section suppresses background noise by weighting in units of frequency bands of speech signals on the basis of the speech and noise frequency band power values obtained by the speech and noise band power calculator sections.

According to this arrangement, directionless noise (background noise) which cannot be suppressed by a conventional beam former is suppressed by spectrum subtraction using the target speech components and noise components, which can be obtained by the beam formers in the system of the present invention. More specifically, the system of the present invention comprises two beam formers for respectively extracting target speech components and noise components. By executing spectrum subtraction using the target speech components and noise components as the outputs from these beam formers, directionless background noise components are suppressed. Spectrum subtraction (SS) is known as noise suppression processing. However, since conventional spectrum subtraction (SS) uses a microphone for one channel (i.e., a single microphone), and estimates noise power in a non-vocal activity period from the output from this microphone, it cannot cope with non-steady noise components superposed on speech components. On the other hand, when microphones for two channels (e.g., two microphones) are used, and are respectively used for collecting noise components, and noise-superposed speech components, the two microphones must be placed at separate positions. As a consequence, the phase of noise components superposed on speech components shifts from that of noise components received by the noise collecting microphone, and the noise suppression effect of spectrum subtraction cannot be improved largely.

However, according to the present invention, a beam former which extracts noise components is prepared, and its output is used. Hence, phase shift can be corrected, and spectrum subtraction which can assure high precision even for non-steady noise can be realized. Furthermore, since the output from the beam former in the frequency domain is used, spectrum subtraction can be done without frequency analysis, and non-steady noise can be suppressed by a smaller computation amount than the conventional system.

Moreover, the fourth invention of the present invention further comprises, in the noise suppression apparatus of the third invention, an input band power calculator section for calculating input power for each band by dividing the frequency components of input signals obtained by frequency-analyzing the input signals obtained from the speech input section in units of frequency bands, and the spectrum calculator section executes a process for suppressing background noise by weighting in units of frequency bands of speech signals on the basis of the input band power, speech band power, and noise band power.

In case of this arrangement, the speech band power calculator section calculates speech power for each band by dividing the obtained speech frequency spectrum components in units of frequency bands, and the noise band power calculator section calculates noise power for each band by dividing the obtained noise frequency spectrum components in units of frequency bands. Also, the input band power calculator section is added. This input band power calculator section receives frequency spectrum components of the input speech obtained by frequency-analyzing the input signals obtained from the speech input section, and calculates input power for each band by dividing the received frequency spectrum components in units of frequency bands. The spectrum calculator section suppresses background noise by weighting in units of frequency bands of speech signals on the basis of the input signal, speech, and noise frequency band power values obtained by the input signal, speech, and noise band power calculator sections.

In the fourth invention, since the power of noise components is corrected in spectrum subtraction in the third invention, noise suppression can be done with higher precision. More specifically, since the third invention assumes small power N of the noise source, spectrum subtraction (SS) inevitably increases distortion in speech components superposed with noise source components. However, in this invention, the band weight calculation results of spectrum subtraction in the third invention are corrected using the power of the input signal.

In this way, only speech components from which directional noise components and directionless noise components are suppressed, and which suffer less distortion, can be extracted.

Note that the present invention is not limited to the aforementioned embodiments, and various modifications may be made.

To restate, according to the present invention, the overall computation amount can be greatly reduced, and the need for conversion from the time domain to the frequency domain, which was required upon estimating the direction using the filter of a beam former, can be obviated, thus further reducing the overall computation amount.

According to the present invention, a beam former which extracts noise components is prepared, and its output is used. Hence, phase shift can be corrected, and spectrum subtraction which can assure high precision even for non-steady noise can be realized. Furthermore, since the output from the beam former in the frequency domain is used, spectrum subtraction can be done without frequency analysis, and non-steady noise can be suppressed by a smaller computation amount than the conventional system. Therefore, not only directional noise components but also directionless noise components (background noise) can be suppressed, and speech components which suffer less distortion can be extracted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A noise suppression apparatus for independently outputting speech frequency components and noise frequency components, comprising:

a speech input section which receives speech uttered by a speaker at different positions and generates speech signals corresponding to the different positions;

a frequency analyzer section which frequency-analyzes the speech signals in units of channels of the speech signals to output frequency components for a plurality of channels;

a first beam former processor section which suppresses arrival noise other than a target speech by adaptive filtering using the frequency components for the plurality of channels to output the target speech;

a second beam former processor section which suppresses the target speech by adaptive filtering using the frequency components for the plurality of channels to outputting noise;

a noise direction estimating section which estimates a noise direction from filter coefficients calculated by the first beam former processor section;

a target speech direction estimating section which estimates a target speech direction from filter coefficients calculated by said second beam former processor section;

a target speech direction correcting section which corrects a first input direction as an arrival direction of the target speech to be input in said first beam former processor section on the basis of the target speech direction estimated by said target speech direction estimating section; and a noise direction correcting section which corrects a second input direction as an arrival direction of noise to be input in said second beam former processor section on the basis of the noise direction estimated by said noise direction estimating section.

2. An apparatus according to claim 1, further comprising a spectrum subtraction noise suppression section including a speech band power calculator section which divides the obtained speech frequency components in units of frequency bands and calculates speech power for each band, a noise band power calculator section which divides the obtained noise frequency components in units of frequency bands and calculates noise power for each band, and a spectrum subtractor section which suppresses background noise by weighting in units of frequency bands of speech signals on the basis of the speech and noise frequency band power values obtained by said speech and noise band power calculator sections.

3. An apparatus according to claim 1, further comprising a speech band power calculator section which divides the obtained speech frequency components in units of frequency bands and calculates speech power for each band; a noise band power calculator section which divides the obtained noise frequency components in units of frequency bands and calculates noise power for each band; an input band power calculator section which divides, in units of frequency bands, frequency components of input signals obtained by frequency-analyzing the input signals obtained from said speech input section and calculates input power for each band; and a corrected spectrum subtractor section for suppressing background noise by weighting in units of frequency bands of speech signals on the basis of the input band power, speech band power, and noise band power.

4. An apparatus according to claim 1, wherein said frequency analyzer section converts the speech signal components for the plurality of channels in a time domain into signal components in a frequency domain by the fast Fourier transform, and outputs frequency spectrum data in units of channels.

5. An apparatus according to claim 1, wherein said target speech direction correcting section converts estimation amount information output from said target speech direction estimating section into angle information of a current target speech source direction, and outputs the angle information to said first beam former processor section.

6. An apparatus according to claim 1, wherein said noise direction correcting section converts estimation amount information output from said noise direction estimating section into angle information of a current target noise source direction, and outputs the angle information to said second beam former processor section.

7. An apparatus according to claim 1, wherein each of said first and second beam former processor sections comprises a phase shifter configured to set an input direction of the beam former processor section, and a beam former main section configured to suppress components from directions other than an arrival direction of signal components to be extracted.

8. An apparatus according to claim 1, wherein said speech input section has at least first and second microphones, which are placed at least two different positions, and output frequency components for at least two speech channels.

9. A noise suppression apparatus for independently outputting speech frequency components and noise frequency components, comprising:

a speech input section which receives speech uttered by a speaker at least at two different positions and generates speech signals corresponding to the speech receiving positions in units of channels;

a frequency analyzer section which frequency analyzes the speech signals and outputs frequency components for a plurality of channels;

a first beam former processor section which executes arrival noise suppression processing for suppressing speech components other than speech from a speaker direction to obtain a target speech component, the noise suppression processing being performed by adaptive filtering of the frequency components for the plurality of channels obtained by said frequency analyzer section, using filter coefficients which are calculated to decrease sensitivity levels in directions other than a desired direction;

a second beam former processor section which executes second speech suppression processing for suppressing the speech from the speaker direction to obtain a first noise component, the speech suppression processing being performed by adaptive filtering of the frequency components for the plurality of channels obtained by said frequency analyzer section, using filter coefficients which are calculated to decrease sensitivity levels in directions other than a desired direction;

a third beam former processor section which executes second speech suppression processing for suppressing the speech from the speaker direction to obtain a second noise component, the second speech suppression processing being performed by adaptive filtering of the frequency components for the plurality of channels obtained by said frequency analyzer section, using filter coefficients which are calculated to decrease sensitivity levels in directions other than a desired direction;

a noise direction estimating section which estimates a noise direction from the filter coefficients calculated by said first beam former processor section;

a first target speech direction estimating section which estimates a first target speech direction from the filter coefficients calculated by said second beam former processor section;

a second target speech direction estimating section which estimates a second target speech direction from the filter coefficients calculated by said third beam former processor section;

a first input direction correcting section which corrects a first input direction as an arrival direction of target speech to be input in said first beam former processor section on the basis of at least one of the first target speech direction estimated by said first target speech direction estimating section and the second target speech direction estimated by said second target speech direction estimating section;

a second input direction correcting section which, when the noise direction estimated by said noise direction estimating section falls with a predetermined first range, corrects a second input direction as an arrival direction of noise to be input in said second beam former processor section on the basis of the noise direction;

a third input direction correcting section which, when the noise direction estimated by said noise direction estimating section falls with a predetermined second range, corrects a second input direction as an arrival direction of noise to be input in said third beam former processor section on the basis of the noise direction; and an effective noise determination section which determines one of the first and second output noise components as true noise output components on the basis of whether the noise direction estimated by said noise direction estimating section falls within the predetermined first or second ranges and outputs the determined output noise component, and at the same time, determines which estimation result of said first and second speech direction estimating sections is effective and outputs the determined speech direction estimation result to said first input direction correcting section.

10. An apparatus according to claim 9, further comprising a spectrum subtraction noise suppression section including a speech band power calculator section configured to divide the obtained speech frequency components in units of frequency bands and calculate speech power for each band, a noise band power calculator section configured to divides the obtained noise frequency components in units of frequency bands and calculates noise power for each band, and a spectrum subtractor section configured to suppress background noise by weighting in units of frequency bands of speech signals on the basis of the speech and noise frequency band power values obtained by said speech and noise band power calculator sections.

11. An apparatus according to claim 9, further comprising a speech band power calculator section configured to divide the obtained speech frequency components in units of frequency bands and calculate speech power for each band; a noise band power calculator section configured to divide the obtained noise frequency components in units of frequency bands and calculate noise power for each band; an input band power calculator section configured to divide, in units of frequency bands, frequency components of input signals obtained by frequency-analyzing the input signals obtained from said speech input section calculating input power for each band; and a corrected spectrum subtractor section configured to suppress background noise by weighting in units of frequency bands of speech signals on the basis of the input band power, speech band power, and noise band power.

12. An apparatus according to claim 9, wherein said first input direction correcting section converts estimation amount information output from at least one of said first and second target speech direction estimating sections into angle information of a current target speech source direction, and outputs the angle information to said first beam former processor section.

13. An apparatus according to claim 9, wherein said second input direction correcting section converts estimation amount information output from said noise direction estimating section into angle information of a current target noise source direction, and outputs the angle information to said second beam former processor section.

14. An apparatus according to claim 9, wherein said third input direction correcting section converts estimation amount information output from said noise direction estimating section into angle information of a current target noise source direction, and outputs the angle information to said third beam former processor section.

15. A noise suppression method for independently outputting speech frequency components and noise frequency components, comprising the steps of:

receiving speech uttered by a speaker at different positions to obtain speech signals of different channels;

frequency-analyzing the speech signals in units of channels to obtain frequency spectrum components in units of channels;

suppressing arrival noise other than a target speech by adaptive filtering using the frequency spectrum components in units of channels obtained in the frequency analyzing step, to output the target speech;

suppressing the target speech by adaptive filtering using the frequency components in units of channels to obtain noise components;

estimating a noise direction from filter coefficients used in adaptive filtering and calculated in the step of suppressing arrival noise;

estimating a target speech direction from filter coefficients used in adaptive filtering and calculated in the step of suppressing the target speech;

correcting a first input direction as an arrival direction of the target speech to be input in the step of suppressing arrival noise on the basis of the target speech direction estimated in the step of estimating a target speech direction; and correcting a second input direction as an arrival direction of noise to be input in the step of suppressing the target speech on the basis of the noise direction estimated by the step of estimating a noise direction.

16. A method according to claim 15, further comprising the steps of dividing the obtained speech frequency components in units of frequency bands, calculating speech power for each band, dividing the obtained noise frequency components in units of frequency bands, calculating noise power for each band, and suppressing background noise by weighting in units of frequency bands of speech signals on the basis of the speech and noise frequency band power values obtained in the speech and noise band power calculation steps.

17. A method according to claim 15, further comprising: the steps of dividing the obtained speech frequency components in units of frequency bands, calculating speech power for each band, dividing the obtained noise frequency components in units of frequency bands, calculating noise power for each band, dividing frequency components of input signals obtained in the frequency analyzing step in units of frequency bands, calculating input power for each band, and suppressing background noise by weighting in units of frequency bands of speech signals on the basis of the input band power, speech band power, and noise band power.

18. A noise suppression method comprising the steps of:

receiving speech uttered by a speaker at different positions to obtain speech signals of different channels;

frequency-analyzing speech signals in units of channels to obtain frequency spectrum components in units of channels;

executing arrival noise suppression processing for suppressing speech components other than speech from a speaker direction to obtain target speech components, the arrival noise suppression processing being performed by adaptive filtering of the frequency spectrum components for the plurality of channels obtained in units of channels in the frequency analyzing step, using filter coefficients which are calculated to decrease sensitivity levels in directions other than a desired direction;

executing first speech suppression processing for suppressing the speech from the speaker direction to obtain first noise components, the first speech suppression processing being performed by adaptive filtering of the frequency components for the plurality of channels using the frequency components obtained in units of channels in the frequency analyzing step, using filter coefficients which are calculated to decrease sensitivity levels in directions other than a desired direction;

executing second speech suppression processing for suppressing the speech from the speaker direction to obtain first noise components, the second speech suppression processing being performed by adaptive filtering of the frequency spectrum components for the plurality of channels obtained in units of channels in the frequency analyzing step, using filter coefficients which are calculated to decrease sensitivity levels in directions other than a desired direction;

estimating a noise direction from the filter coefficients calculated in the step of suppressing arrival noise suppression processing;

estimating a first target speech direction from the filter coefficients calculated in the step of executing first speech suppression processing;

estimating a second target speech direction from the filter coefficients calculated in the step of executing second speech suppression processing;

correcting a first input direction as an arrival direction of target speech to be input in the step of executing arrival noise suppression processing on the basis of at least one of the first target speech direction and the second target speech direction;

correcting a second input direction as an arrival direction of noise to be input in the step of executing first suppression processing on the basis of the noise direction estimated in the noise direction estimating step, as needed, when the noise direction falls with a predetermined first range;

correcting a second input direction as an arrival direction of noise to be input in the step of executing second speech suppression processing on the basis of the noise direction, when the noise direction falls with a predetermined second range; and determining one of the first and second output noise components as true noise output components on the basis of whether the noise direction estimated in the noise direction estimating step falls within the predetermined first or second ranges and outputting the determined output noise component, and at the same time, determining which estimation result in the first and second speech direction estimating steps is effective and outputting the determined speech direction estimation result as a speech direction estimation result to be used in the first input direction correcting step.

19. A method according to claim 18, further comprising the steps of dividing the obtained speech frequency components in units of frequency bands, calculating speech power for each band, dividing the obtained noise frequency components in units of frequency bands, calculating noise power for each band, and suppressing background noise by weighting in units of frequency bands of speech signals on the basis of the speech and noise frequency band power values obtained in the speech and noise band power calculation steps.

20. A method according to claim 18, further comprising the steps of by dividing the obtained speech frequency components in units of frequency bands, calculating speech power for each band, dividing the obtained noise frequency components in units of frequency bands calculating noise power for each band, dividing frequency components of input signals obtained in the frequency analyzing step in units of frequency bands calculating input power for each band, and the corrected spectrum subtraction step of suppressing background noise by weighting in units of frequency bands of speech signals on the basis of the input band power, speech band power, and noise band power.

* * * * *